(12) United States Patent
Shankwitz et al.

(10) Patent No.: US 7,990,286 B2
(45) Date of Patent: Aug. 2, 2011

(54) VEHICLE POSITIONING SYSTEM USING LOCATION CODES IN PASSIVE TAGS

(75) Inventors: Craig Shankwitz, Minneapolis, MN (US); Mathew Bevilacqua, Port Perry (CA); Max Donath, St. Louis Park, MN (US); Lee Alexander, Woodbury, MN (US); Pi-Ming Cheng, Roseville, MN (US); Alec Gorjestani, Rosemount, MN (US); Bryan Newstrom, Circle Pines, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 571 days.

(21) Appl. No.: 11/884,254

(22) PCT Filed: Feb. 14, 2006

(86) PCT No.: PCT/US2006/005258
§ 371 (c)(1),
(2), (4) Date: Apr. 22, 2008

(87) PCT Pub. No.: WO2006/088916
PCT Pub. Date: Aug. 24, 2006

(65) Prior Publication Data
US 2009/0115638 A1 May 7, 2009

Related U.S. Application Data

(60) Provisional application No. 60/652,555, filed on Feb. 14, 2005, provisional application No. 60/692,926, filed on Jun. 21, 2005.

(51) Int. Cl.
*G08G 1/123* (2006.01)
(52) U.S. Cl. .......... 340/988; 340/435; 701/301
(58) Field of Classification Search .......... 340/988, 340/905, 435; 701/1, 301
See application file for complete search history.

(56) References Cited

U.S. PATENT DOCUMENTS

| | | | | |
|---|---|---|---|---|
| 3,601,602 A | * | 8/1971 | Smith | 246/124 |
| 6,720,920 B2 | | 4/2004 | Breed et al. | |
| 7,110,880 B2 | * | 9/2006 | Breed et al. | 701/207 |
| 7,202,776 B2 | * | 4/2007 | Breed | 340/435 |
| 7,418,346 B2 | * | 8/2008 | Breed et al. | 701/301 |
| 2003/0093187 A1 | | 5/2003 | Walker | |
| 2004/0234268 A1 | | 11/2004 | Olch | |
| 2004/0239552 A1 | | 12/2004 | Chon et al. | |

* cited by examiner

*Primary Examiner* — John A Tweel, Jr.
(74) *Attorney, Agent, or Firm* — Schwegman, Lundberg & Woessner P.A.

(57) ABSTRACT

Vehicles driving on a roadway interrogate passive tags in or on lanes of the roadway. Codes in the tags represent locations along the highway and which lane the vehicle is traveling in. Units in the vehicles communicate longitudinal and lane positions derived from the codes among each other or with infrastructure units for purposes such as traffic management, alerts concerning other vehicles, alerts concerning external conditions, or traffic control. The units may also communicate vehicle lengths or other parameters or characteristics. Vehicle units may communicate with sensors and actuators in the vehicles for purposes such as updating the vehicles' positions between adjacent tags. Specific applications for intelligent transportation systems are described.

6 Claims, 10 Drawing Sheets

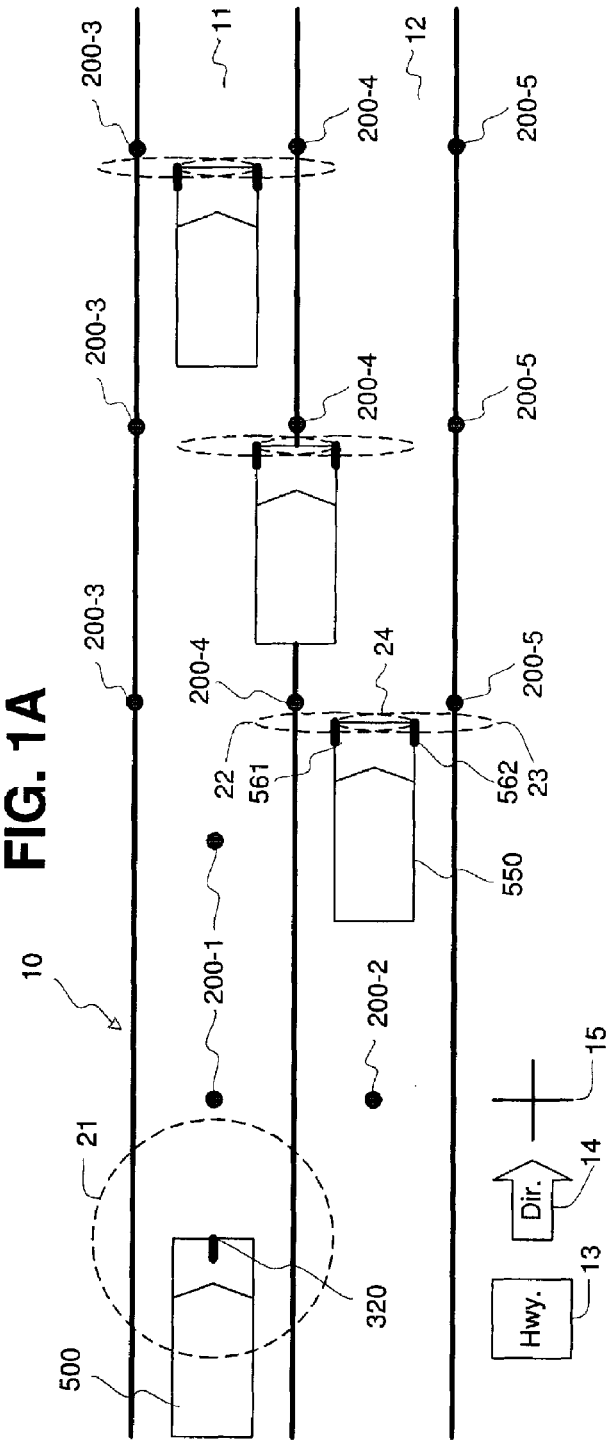

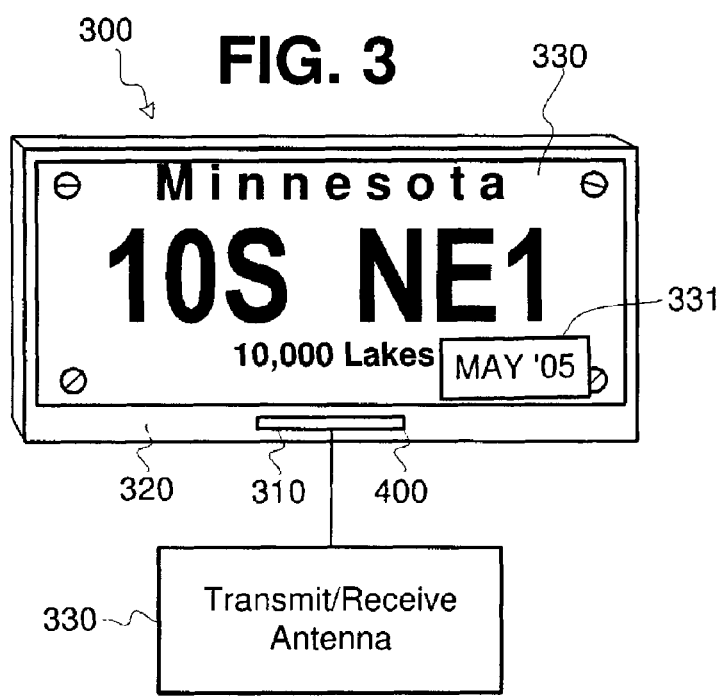
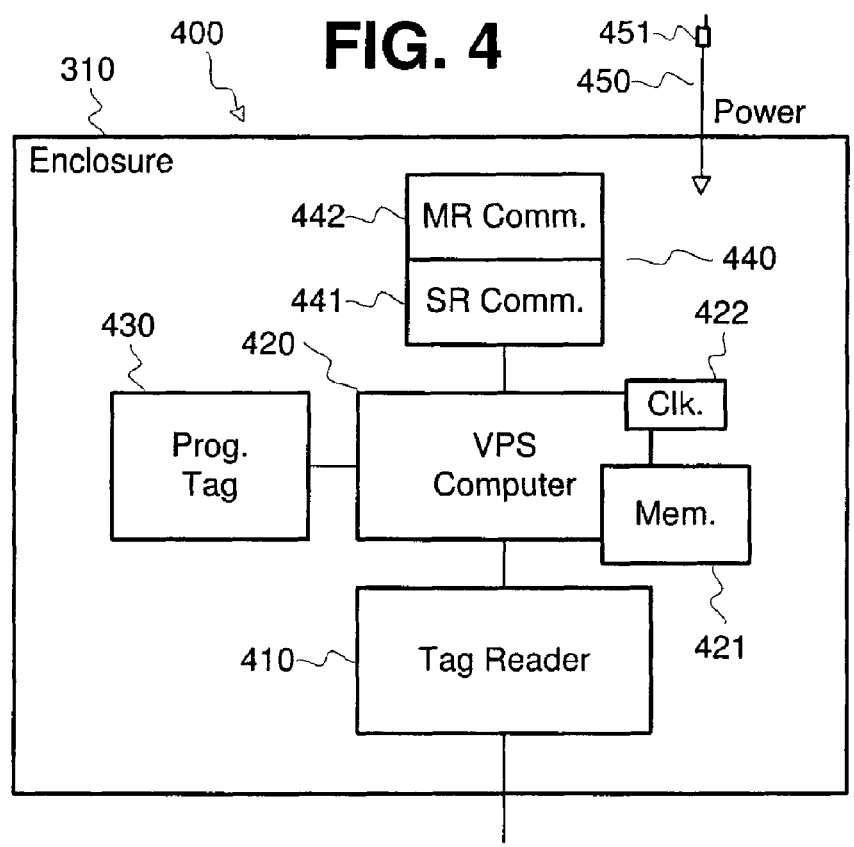

FIG. 7
FIG. 8
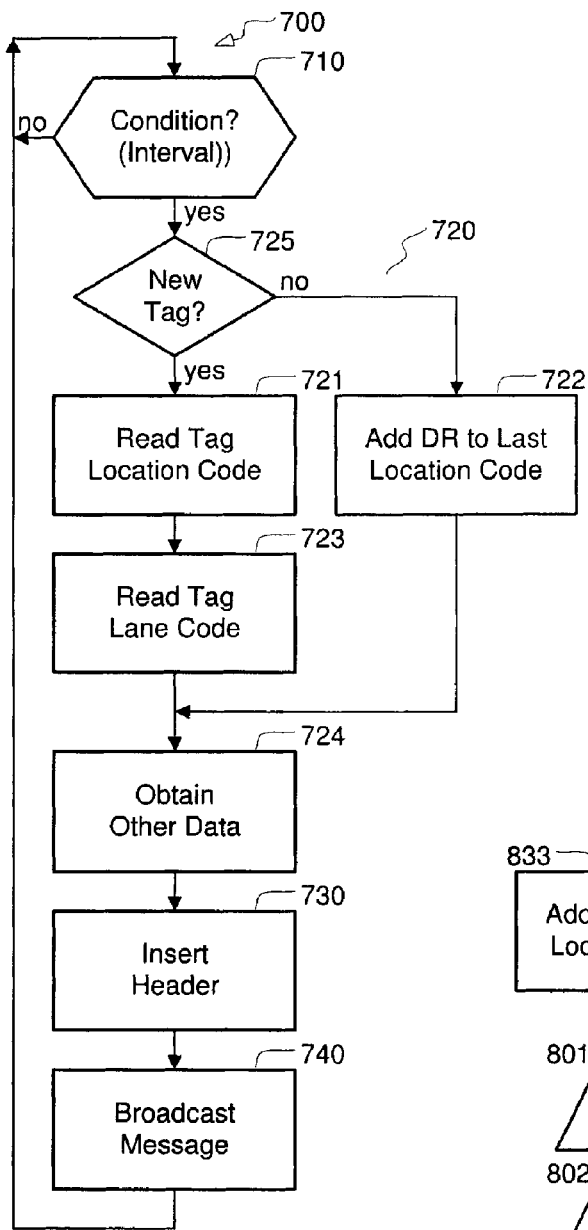
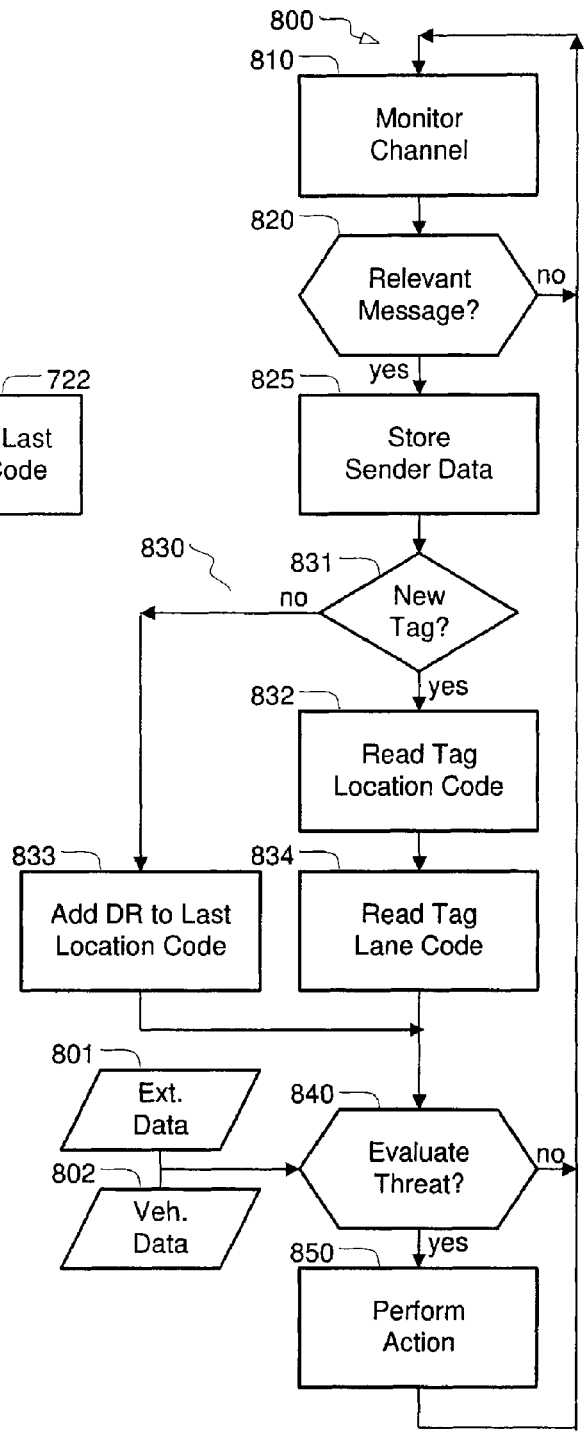

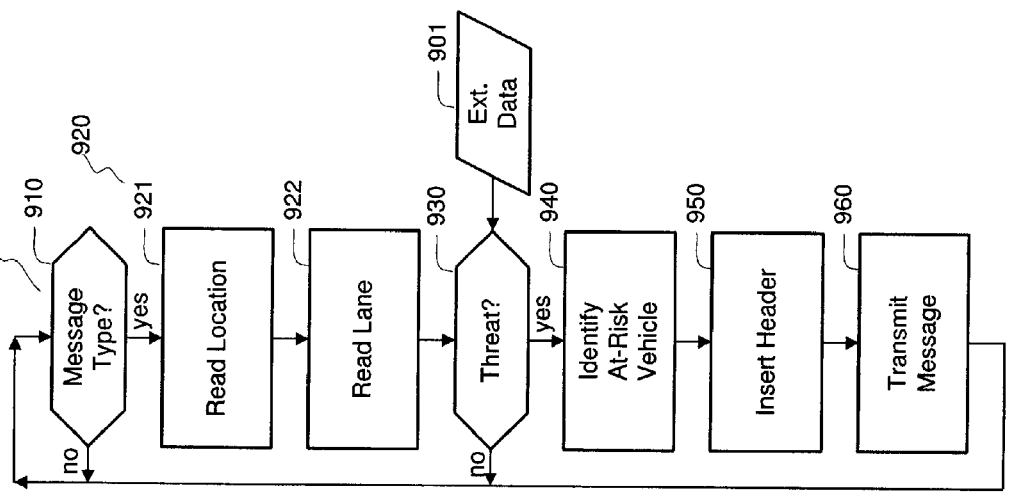
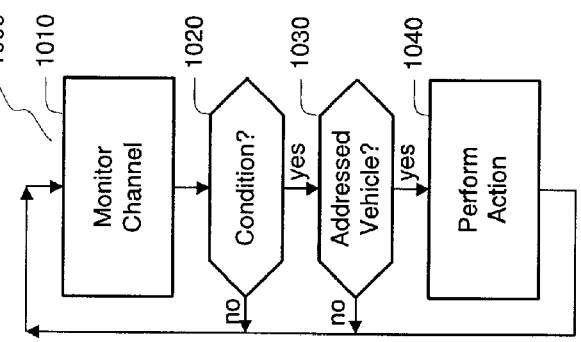
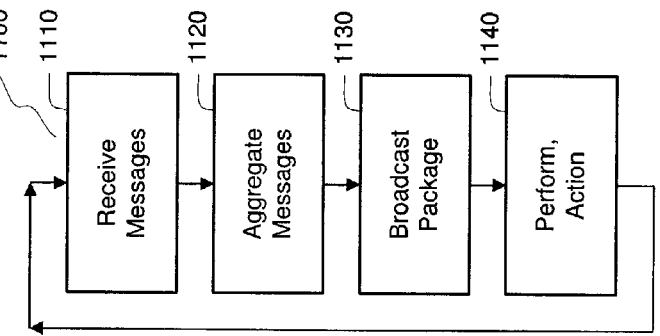

VEHICLE POSITIONING SYSTEM USING LOCATION CODES IN PASSIVE TAGS

RELATION TO OTHER APPLICATIONS

This application is a nationalization under 35 U.S.C. §371 of PCT/US2006/005258, filed Feb. 14, 2006 and published as WO 2006/088916 A2, on Aug. 24, 2006, which claims priority from U.S. provisional applications Ser. No. 60/652,555, filed Feb. 14, 2005, and Ser. No. 60/692,926, filed Jun. 21, 2005, which applications and publications are incorporated herein by reference and made a part hereof.

TECHNICAL FIELD

The present subject matter relates to vehicle and infrastructure units for intelligent transportation systems, and more particularly concerns determining vehicle positions on roadways.

BACKGROUND

Intelligent transportation systems (ITS), sometimes known as intelligent highways, intelligent vehicles, or driver assistance systems, have engaged the interest of transportation planners for some years. A few applications have already been deployed, and many others await. Application areas include vehicle location, warning vehicles of the actions of other vehicles, alerting drivers to environmental and infrastructure conditions, traffic control, and others.

One of the barriers to ITS deployment is the need for wireless data communications over medium ranges, perhaps 300-2000 meters. However, recent work has produced specifications for a number of suitable and inexpensive communications protocols. For example, the Institute of Electrical and Electronic Engineers (IEEE) has adopted a packet-based low-latency protocol operating at 5.9 GHz, known as IEEE 802.11p, or Dedicated Short Range Communications (DSRC).

A remaining problem, however, concerns the sensing of vehicle positions with high accuracy and yet at a cost low enough to be affordable for every vehicle. The Global Positioning System (GPS) has become widespread, although it is still on the high end of an acceptable cost range. However, a number of ITS applications require accuracy that may lie beyond the ability of GPS and similar navigation aids. For example, an ITS application may wish to alert a driver in one lane of a roadway, while not alerting the driver of a vehicle a meter or so away in the next lane. Infrastructure units, such as traffic-light controllers, may wish to know which highway lane a vehicle is in. Besides accuracy or resolution limitations, GPS may be unavailable or unreliable in some areas. Overpasses may block satellite signal reception. Tall buildings in downtown areas may lead to multipath distortion. Roadside vehicle sensors such as radar are expensive, energy-intensive, and may also be subject to signal blockage from nearer vehicles or other objects. Active in-roadway sensors such as current-loop detectors are commonly used today for applications such as vehicle sensing at traffic lights and other signals. These systems, however, are prone to circuit faults in the pavement and other failures.

Another problem is that conventional intelligent highway systems place a vehicle at only a single point on a roadway. This is not sufficient for a number of ITS applications. For example, a vehicle whose front is 50 feet behind the front of a second vehicle in the next lane might merge into that lane safely if the second vehicle is a passenger car. However, a collision may result if the second vehicle is a tandem-trailer truck. That is, conventional systems are hampered in that they are not able to determine the total extent of road space that a vehicle actually occupies.

SUMMARY

An aspect of the present invention employs passive electronic tags in or on roadways to locate vehicles for a number of ITS applications. The tags may be similar to the Radio Frequency Identification (RFID) tags being proposed to replace bar code labels on merchandise. Tags of this class are very inexpensive, small, physically rugged, and likely to be inexpensive.

Electronic readers for such tags may be combined with a microprocessor, memory, and communications electronics in a small package that can be mounted in or on vehicles easily at low cost, and may be supplied by governmental agencies as well as by vehicle manufacturers or after-market suppliers. On-board vehicle readers may communicate with other functions in the same vehicle, with other vehicles on the roadway, or with nearby infrastructure units. The infrastructure units also may be small, inexpensive, and easy to install. For example, tags may be installed by government agencies when lane boundaries are renewed, generally at least once every three years.

Another aspect of the invention determines the extent of road space occupied by a vehicle. That is, the vehicle is represented as both a physical position on the roadway and as an extent or length about that position. Both position and length information may be communicated to other vehicles on the roadway, to infrastructure units along the roadway, or to both.

Aspects of the invention enable a number of applications. Some of these applications do not require that every vehicle be equipped with a vehicle position system (VPS) according to the invention; the drivers of unequipped vehicles are no worse off than current drivers are. Some of the applications provide incentives for owners to install VPSs in their vehicles. Simple vehicle units are inexpensive and small enough that state governments may mandate their use, or may encourage it by offering additional privileges. For some applications, such universal deployment may effect major reductions in crashes or fatalities. After suitable standards are developed, vehicle manufactures may realize benefits to installing on-board units in new vehicles, taking advantage of the position-sensing systems described herein. Also, once the tags are installed, the incremental cost of adding new applications is very low.

DRAWING

FIG. 1A is a high-level schematic representation of an example system.

FIG. 2 shows the data content of a representative passive location tag.

FIG. 3 shows a license-plate frame for use on a vehicle.

FIG. 4 is a block diagram of a data-processing system for FIG. 3.

FIG. 7 is a flowchart of methods executing in a vehicle for transmitting messages.

FIG. 8 shows methods executing in a vehicle-based unit for receiving messages.

FIG. 9 shows a method executing in infrastructure units for communicating with vehicles.

FIG. 10 is a flowchart of further vehicle-based methods for receiving messages.

FIG. 11 is a flowchart of further methods executing in infrastructure units.

DESCRIPTION

Figure 1B:
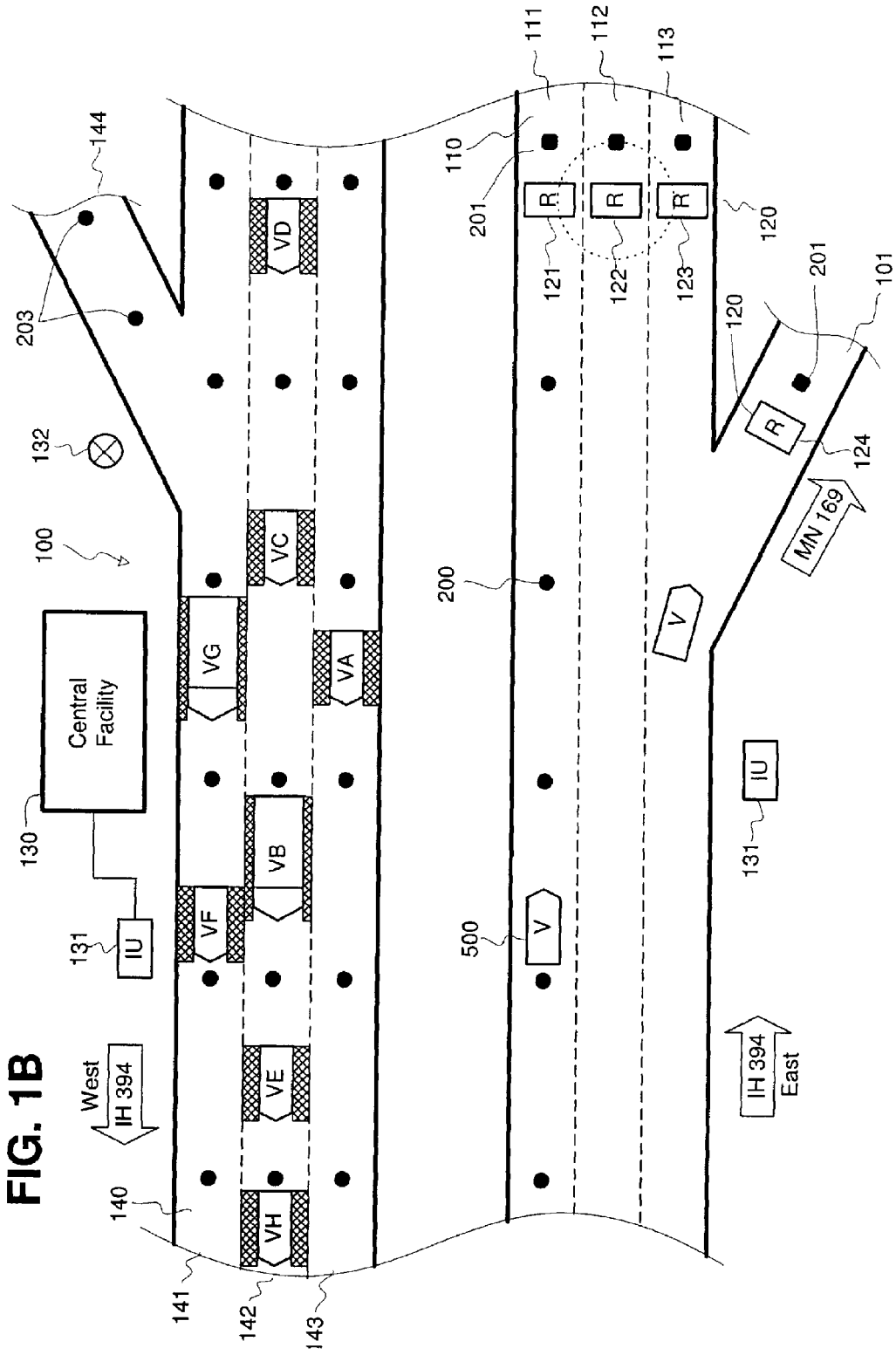
FIG. 1B is a schematic representation of a roadway for a number of VPS applications.

FIG. 1A shows a short section of a roadway 10 having two lanes 11 and 12. The roadway has a designation, such as a highway number 13. The lanes have a direction 14, that may be designated in approximate compass directions, such as "eastbound," or may have other or arbitrary indications. Waypoint 15 represents a physical location from which distances may be measured in a longitudinal direction—that is, along roadway 10. Waypoint 15 need not appear as a physical object; its function is only to serve as a physical position for counting distance.

Coded passive tags 200, symbolized by the solid circles in FIG. 1A, are positioned in or on the surface of roadway 10 in lanes 11, 12 along its length. Passive tags require no internal electrical power. They are interrogated by a reader and return a code stored in an internal memory, which is then received by the reader. Tags 200 may conveniently employ radio-frequency identification (RFID) technology, similar to that employed in commerce for identifying products, and they will henceforth be referred to as "RFID tags," regardless of their actual implementation technology. Passive tags with adequate code capacity may be physically small, typically about 5-100 cm$^2$ for this purpose. Passive tags may be inexpensive to manufacture in large quantities. They are also physically rugged, and may further be encapsulated for additional protection if desired. They may be easily buried at a shallow depth in the material of roadway 100, or deposited under an asphalt layer when a road is resurfaced, or embedded in applied lane-marking tapes or other objects. If tags are to be laid down in lane stripes or adhesive traffic tapes, then they should not be physically wider than those strips. Such tags may be read using frequencies in a wide ambit of the radio spectrum. A set of tags may be received from a manufacturer with some or all of the codes already programmed. However, it may be convenient to receive wholly or partially blank tags and to program the codes into the tags when they are installed in a roadway. For example, if tags are embedded in lane tapes, they may be fed through a programmer at the time the tapes are laid from a truck, using knowledge of the truck's current position to derive the location code.

FIG. 2 shows the information contents of a representative tag 200. A code segment 210 identifies the name of the roadway, either directly or by a designation that is unique over a desired network of roads. Code segment 220 identifies a lane, either directly or indirectly. That is, tags 200-1 in FIG. 1A carry a code that designates lane 11, and tag 200-2 designates lane 12. The lane identifications need be unique only within a single highway code 210, if more than one of the lanes carry tags. A "lane" in this context is a path along the length of a roadway for vehicle travel. A lane is delineated on a street or highway to accommodate a single line of vehicle traffic. It may or may not be marked in a manner visible to drivers. The tags themselves may be placed at different points along the width of a lane; tags 200-1 and 200-2 are centered in their lanes, while tags 200-3 through 200-5 appear at the lane boundaries. If desired for finer lateral location of vehicles, multiple tags may be laid across the width of a lane.

Code segment 230 designates a traffic direction along highway 100: "eastbound" in the case of tags 200 in FIG. 1A. Segment 240 encodes a location along the portion of highway 10, such as a distance in meters, yards, or miles from a milepost or other geographic reference point 15. Other location codes, such as grid lines, may be employed. A vehicle 500 passing the tag at a high rate of speed must be able to interrogate the tag and read its code while within its restricted detection range; this may limit the amount of data that can be usefully contained in a tag. The location codes may be entirely independent of any kind of map or latitude/longitude coordinates. Flags 250 may be employed for purposes described hereinafter. In the present context, a flag is a data item that is fixed within the tag to indicate a type of tag or an interpretation of other data in the tag. Other data 260 may also be included, for message text or other purposes.

For some applications the resolution of the tags containing location codes may be as high as approximately 0.1 mile. For others, a finer resolution is appropriate; resolutions down to twice the detection range of a vehicle's tag reader. For many safety-related applications, a spacing of about 25-100 meters may be suitable. Resolution of distances much finer than that of the tag spacing is achievable by deduced reckoning ("dead reckoning") in the vehicle. For example, a computer may continuously add to the location code of the most recent tag a dead-reckoned distance computed from knowledge of the vehicle's current speed or acceleration. For example, after reader 320 first detects the first tag 200-1 in lane 11, its location code may be incremented at short time intervals by a distance calculated from the vehicle's speed or acceleration over those intervals, until the second tag 200-1 in lane 11 is first detected.

The detection range of RFID tags is substantially determined by the device that reads them; ranges from a few centimeters to a few meters are easily achievable. Unless otherwise specified, "range" herein refers to the largest length of detection by a reader pickup, or by all pickups on a vehicle, if more than one. For the present purpose, the range 21 shown in FIG. 1A should insure detection by vehicles traveling in lane 11, but should exclude detection from all other lanes. A detection range of one-half (or slightly larger) of a lane width is appropriate; in the United States, this would be approximately 1.8-2.2 meters.

Detection range 21 is shown as being circular about the position of reader pickup antenna 320 on vehicle 500. FIG. 1A does not show the reader's transmitting antenna, which may be collocated or at a different place on the vehicle. However, the pattern of the reader's antenna(s) or pickup(s) may be shaped to render its pattern non-circular. It may also be feasible to change a tag's detection pattern within the tag itself, by properly shaping its internal transponder antenna. For many applications, the reader's receiving pattern should be as short as possible in the longitudinal direction (the direction of vehicle travel along the roadway), while still covering a desirable lateral range (across the lanes or the vehicle width). This helps to ensure that the longitudinal position of the front, or other known position, of the vehicle is accurate at the precise time the tag is detected, while permitting tag detection even if the tags are somewhat out of their desired lateral positions. Vehicle 550 in FIG. 1A shows a pair of pickups 561, 562, each having an oval pattern 22, 23. The overall pattern 24 is a narrow oval, with the minor axis being in the direction of vehicle travel; the maximum range is again slightly larger than a lane width, but the detection width is as low as possible along the roadway. FIG. 1A shows another advantage of dual pickups. When vehicle 550 is centered in lane 12, the right pickup 562 detects a lane code indicating the right edge of lane 12, while the left pickup 561 detects a lane code indicating the boundary between lanes 11 and 12. As vehicle 550 moves toward lane 11, pickup 562 begins to lose tag 200-5, and begins to acquire tag 200-4. When 550 is centered between the lanes, in the center position in FIG. 1A, both pickups read tag 200-4 only. In the third position in FIG. 1A, 550 has moved completely into lane 11; pickup 562 still reads tag 200-4, but pickup 561 detects a code in tag 200-3 that indicates the left boundary of lane 11.

Additional pickups may be spaced laterally across the width of the vehicle in order to further resolve the position of the vehicle laterally across the roadway, without increasing the number of tags needed in the roadway. The individual detection range of each pickup is enough to at least touch the individual range of the adjacent pickup, and overlap may be desirable for some purposes. For example, four readers spaced across the width of a vehicle may yield up to seven different detection zones for determining the lateral position of the vehicle with respect to a lane. Higher lateral resolution may be significant for collision detection, lane changing, or driver drowsiness alerts, and other applications. With two or more pickups, a computer such as 420 or 520 may calculate the lateral position of the vehicle within a lane. For example, a computer may calculate that vehicle is entirely within lane 12 in its leftmost position shown in FIG. 1A, that it is in the left side of lane 12 when pickup 652 loses tag 200-3, between lanes 11 and 12 when both pickups acquire tag 200-4 as shown in the middle position in FIG. 1A, and so forth.

FIG. 3 shows an example of an electronic license plate (ELP) 300 that can be mounted on a vehicle. An entire system 400 may be contained or encapsulated within a very small enclosure 310 that fits comfortably within a normal or slightly thicker license-plate frame 320 that mounts in a conventional position. RFID transmit/receive antennas may or may not be too large to mount in the frame itself. For many applications, the placement of antenna package should be standardized among all vehicles; the examples herein employ mounting at the front of the vehicle, so that the reported location of the vehicle refers to the leading edge of the vehicle; unless otherwise stated herein, all vehicle positions refer to the front of the vehicle. Antennas may be mounted under a front bumper at the center or sides of the vehicle. System 400 may receive electrical power from the vehicle, or from a self-contained battery. Legally mandated standard positions for license plates on cars, trucks, motorcycles, etc., may ensure that a tag reader of system 400 is within range of tags 200 as vehicle 500 drives along a roadway lane. ELP 300 offers a convenient way to install system 400 in existing vehicles with little or no modification. Vehicles may emplace system 400 at other points, or combine it with other vehicle systems, so long as the detection range ensures that its reader will read tags only in the appropriate lane.

FIG. 4 is a high-level block diagram of an electronic license-plate system 400, having components placed within a weatherproof enclosure 310. Electronics 400 may alternatively be disposed anywhere in, on, or under the vehicle. Tag reader 410 continuously interrogates roadway tags 200, and transmits to computer 420 the code segments 210-240 of all tags within range as vehicle 500 passes them. Computer 420 includes memory 421 for holding data and instructions. Memory 421 may also hold vehicle characteristics, such as a type (e.g., car, truck, motorcycle), vehicle length, weight per axle, and so forth. Memory 421 may be implemented in ROM, RAM, and other forms as appropriate. A time-of-day (TOD) clock 422, or an interval timer or other time function may therefore be included as part of computer 420, or the time may be made available to system 400 in some other way.

For some applications, a passive programmable RFID (PRFID) tag 430 may communicate a calculated result, such as a toll amount, upon interrogation by a roadside interrogator. A PRFID contains a code that may be dynamically modified, and that can be read out by RFID toll tag readers such as 120 in roadway 100, FIG. 1B. PRFID tag 430 may further contain a code including the license-plate number or other vehicle identifiers. System 400 may further include a unit 440 to provide any of a number of communications functions. Unit 440 may include a short-range communications channel 441 for transferring data within a single vehicle 500. The Bluetooth or ZigBee (specifications publicly available from the ZigBee Alliance) protocols are convenient for this purpose. In some cases, a data bus or other wired connection may provide short-range or intra-vehicle communications. If wireless, this channel may transmit some private data; the data may be encrypted so it is readable only within its own vehicle. Unit 440 may also or alternatively include a medium-range communications channel 442 for transferring data from one vehicle to another vehicle or to the infrastructure. For these purposes, channel 442 may have a range of approximately 300-2000 meters, and may employ, for example, the IEEE 802.11p Dedicated Short-Range Communications (DSRC) protocol, developed specifically for vehicular applications. Unit 440 may also transfer data to and/or from a data-processing system placed in vehicle 500 for other purposes, as described in connection with FIG. 5. For some applications, PRFID tag 430 may be considered as a type of communications unit for vehicle-to-infrastructure data.

Power for the components of system 400 may be obtained via a power line 450. A connector 451 may tap into a vehicle power line to obtain the necessary power, making hookup simple and inexpensive, since all functions for some applications may be executed within electronic license plate 300. If vehicle power is not easily available for the desired plate mounting position, system 400 may include its own power source, such as a battery.

Figure 5A:
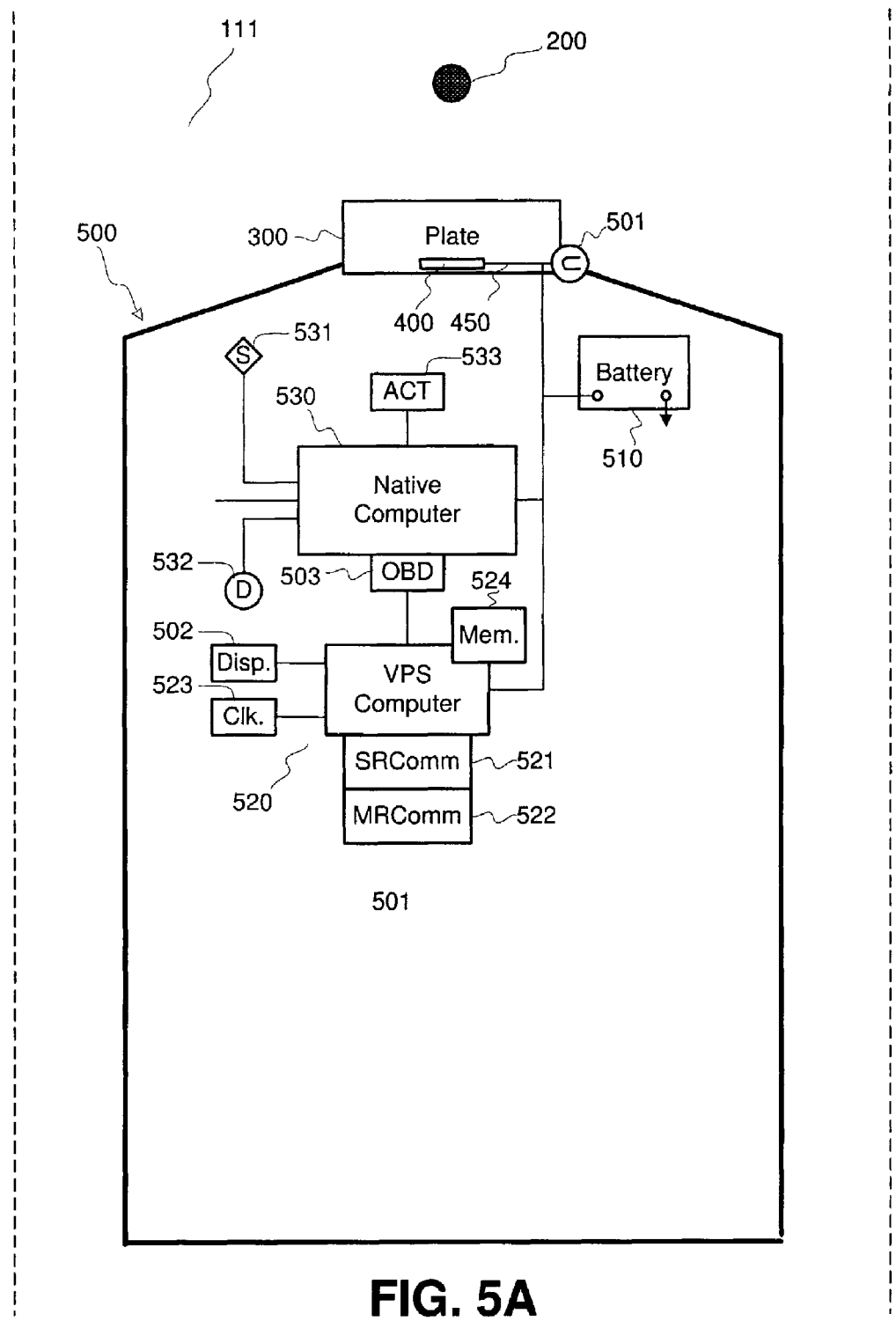
FIG. 5A is a block diagram of vehicle components.

FIG. 5A is a schematic representation of a vehicle 500, including ELP 300. Numeral 501 symbolizes the license plate light or other connection of license-plate system 400 to the vehicle's electrical system 510. Dedicated display 502 may show running tolls, driver alerts, and other information to the vehicle's driver. Data may be transmitted from short-range transceiver 441 to a short-range transceiver 521 in a VPS data-processing system 520 in the vehicle. Again, transceiver 521 may utilize a short-range Bluetooth or similar communications protocol. Encryption may protect private data from being received outside vehicle 500, if desired. In alternative configuration 550, a wired or wireless data bus may transfer data within the vehicle.

FIG. 5A depicts additional elements in vehicle 500 or 550 for VPS functions. Although future passenger cars and other vehicles may incorporate open data-processing systems and data buses for these functions in the future, the rapid incorporation of VPS functions in the near term appears to favor as little modification of present and past vehicle models as possible. For this reason, FIG. 5A shows a detachable VPS data-processing system 520 that may be easily installed in new models and even added to past models as an inexpensive aftermarket item. VPS system 520 may require data concerning operating parameters regarding the vehicle, such as speed or acceleration. Many of these data items have been available in passenger cars and other vehicles since 1996, via a standard on-board diagnostic (currently OBD II) connector 503, usually placed in the vicinity of the instrument panel, or via a vehicle data bus. The OBD II specification calls for power through a pin of connector 503, so VPS system 520 might not even require a separate power connection to vehicle electrical system 510, facilitating installation. Connector 503 may interface to one or more native data-processing systems 530 already in the vehicle, either by a wired connection or via an intra-vehicle wireless communications unit such as 441 or 521. Systems 530 may in turn accept data from sensors 531 and provide outputs to instruments or displays 532 that are already installed in the vehicle. For example, an accelerometer may indicate longitudinal deceleration of vehicle 500, and a speedometer may provide present vehicle speed. Present and future vehicles may also provide access to internal actuators 533, such as airbag detonators, brakes, lights, and so on.

In addition, a medium-range channel 522 may communicate data to other vehicles or to the infrastructure, such as to facility 130, according to the DSRC or another protocol. Communication may be direct, or via a number of dispersed roadside infrastructure units 131. A clock 523 measures time intervals and may also make the current time of day available to VPS data-processing system 520. Clock 523 may alternatively comprise a facility already installed in the vehicle for other purposes. Memory 524 may store instructions for carrying out the operations of VPS system 520 or data, including vehicle characteristics as mentioned earlier.

Figure 5B:
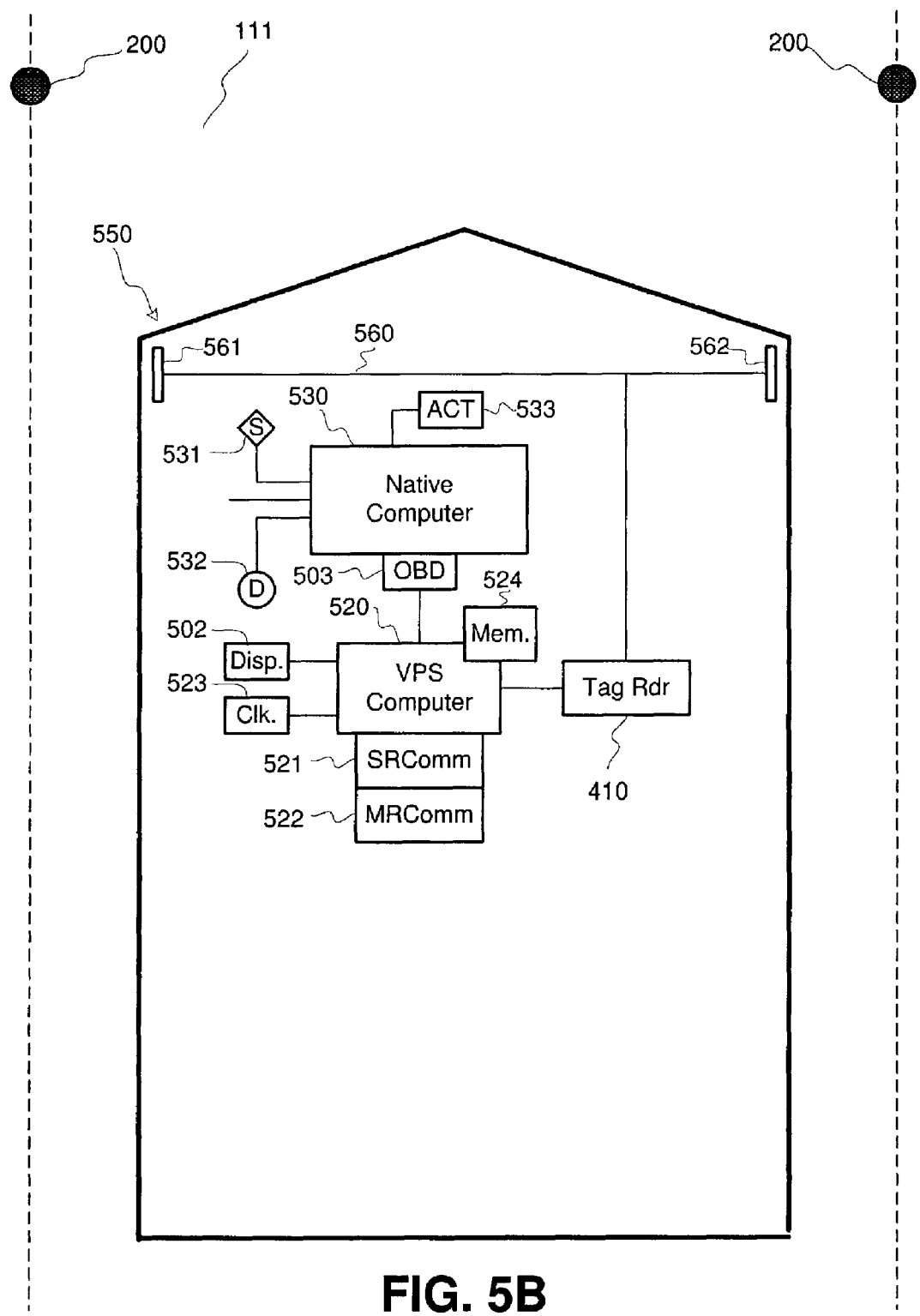
FIG. 5B shows an alternative configuration of vehicle components and lane tags.

FIG. 5B shows an alternative physical layout of components for a vehicle 550. Reader 560 has two antennas or pickups 561, 562 located near the sides of the vehicle, such as under the front bumper. The electronics package may be disposed inside the vehicle, and integrated with VPS computer 520. In many vehicles, an ELP system 300, if used at all, may be mounted outside the vehicle; VPS computer 520 may be placed in the cab, and native computer 530 will reside under the hood. The RFID antennas, however, are usually placed outside the vehicle, such as under the front bumper. Connection to the OBD functions may be wired or wireless using unit 521.

Traffic or Vehicle Management Applications

Some applications of intelligent highways are primarily concerned with the position of a vehicle for traffic-management purposes. FIG. 1B describes an example intelligent roadway, for a toll-collection application described in FIG. 6.

FIG. 1B represents a portion of a roadway 100 and its environment, mostly schematically. That is, the relative sizes and the shapes and proportions of objects in FIG. 1B are not to scale, and their relative locations and numbers are important only when explicitly stated to be so.

For purposes of illustration, roadway 100 is identified as "Interstate Highway 394," having an eastbound set of lanes 110, and having an exit to the right to "Minnesota Highway 169" at 101. Highway lanes 110 comprise a toll lane 111 and two non-toll lanes 112 and 113. The lanes may be the same or different widths; either may have a standard 12-foot (or other standard) width. Vehicles may change lanes at will at any point along the roadway. None of the lanes require any physical impediment to vehicles changing lanes at any location, although the lanes may be conventionally marked by painted lines or reflectors.

At the end of the toll portion of roadway 110, toll readers 120 interrogate the on-board system 400 of a vehicle 500 passing them, to read the toll amount for that vehicle, or to read an accumulated distance in the toll lane, from which a toll charge may be determined. Because a vehicle may exit the toll portion of roadway 100 from a lane other than the toll lane 111, the readers must have a range sufficient to read from vehicles in any of the lanes 111-113. FIG. 1B shows separate units 121-123 within each lane; however a single longer-range unit may serve, and the unit may be placed alongside or over roadway 100 rather than in the lanes themselves. The detection range of a toll reader 120 depends upon the installation location and specific implementation techniques. The range of readers 120 must assure coverage of the entire set of lanes 110, or an entire exit 101. Roadway 100 may have exits such as 101 at any place along the length of the toll portion. A further toll reader 124 captures the toll amount from a vehicle that leaves from exit 101. There is no requirement that an exit from the toll portion be placed in the toll lane itself; a vehicle may travel for some distance in the toll lane, than change lanes and exit from a completely different lane, without any physical impediment or designated entry/exit locations. The toll may be read automatically at toll readers 120, using some form of electronic vehicle identification such as New York's "EZPass" system. In addition, toll readers 120 may communicate with a central facility 130, directly or via roadside in 131, to record a vehicle identification and the toll to be charged, and may then debit an account corresponding to the vehicle ID, or send a monthly bill. Driver privacy may be protected in several ways, such as by encryption. An on-board vehicle system may also generate a random code that uniquely identifies a vehicle. In some cases, toll lane 111 may also serve as a high-occupancy vehicle (HOV) lane, wherein tolls are not charged for vehicles that carry above a certain number of passengers, or might be otherwise exempted.

End-of-toll-lane RFID tags 201 are placed in lanes 110 and exit 101 following toll readers 120. After a vehicle 500 has paid its toll, its license-plate system 400 still retains the toll distance or charge. Tags 201 contain a special reset code or flag that is distinct from any code in tags 200. When a vehicle detects a tag 201, its on-board system 400 resets the toll distance or charge in the vehicle's computer.

Figure 6:
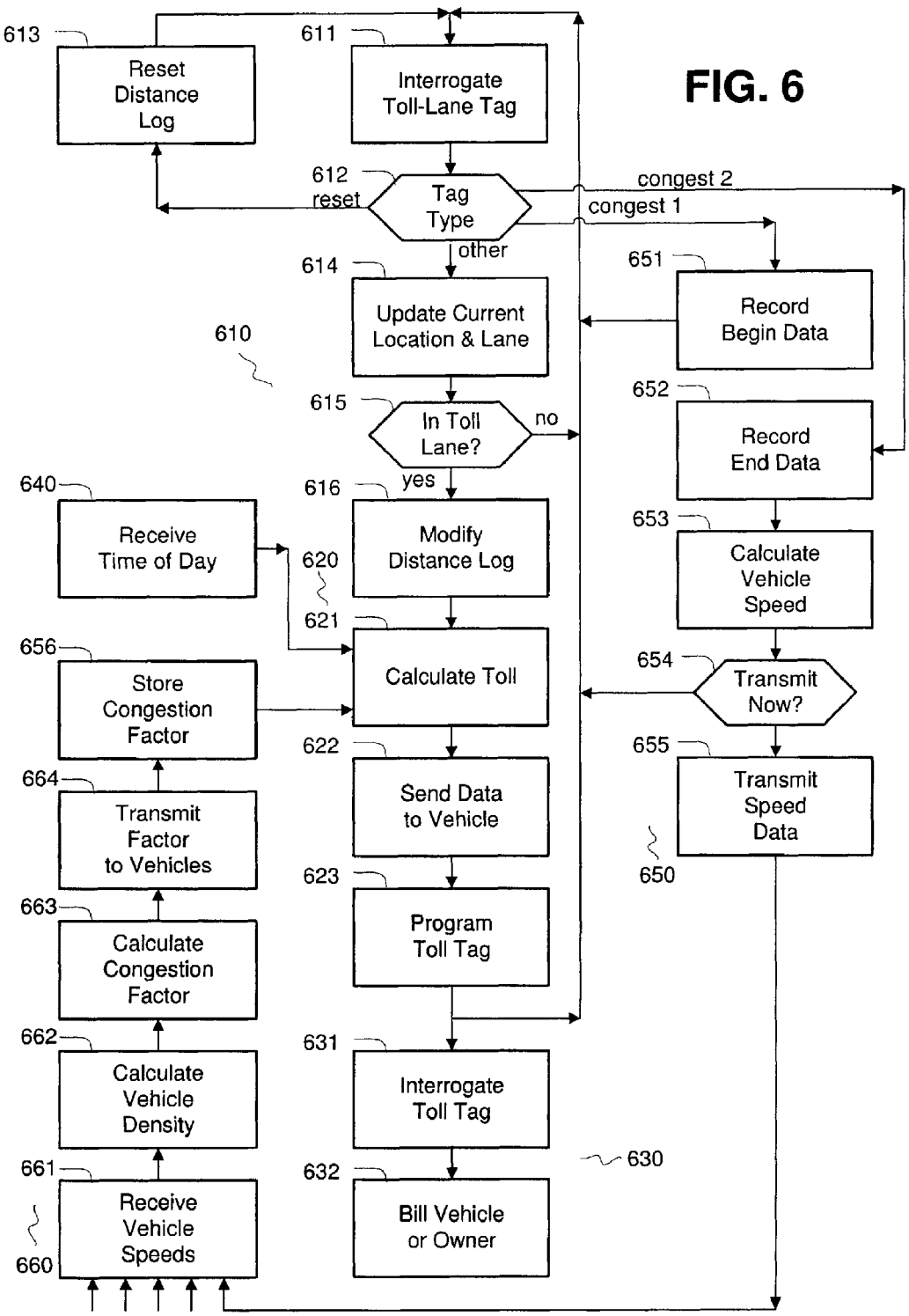
FIG. 6 is a flowchart of a method for collecting tolls.

FIG. 6 is a flow chart of representative methods 600 for collecting tolls according to travel distance in a toll lane 111, where a vehicle may move freely into and out of the toll lane at arbitrary places along highway 100. Operations are performed in the vehicle, except where noted otherwise.

Blocks 610 determine the total distance that vehicle 500 travels in the toll lane 111. Whenever vehicle 500 passes a tag 200, block 611 reads its data. Block 612 determines the type of the tag from its flags and/or codes. If the tag is an end-of-toll-lane flag 250, then block 613 resets a distance log. If the tag is other than this type of tag, block 614 updates a current position from the tag's location code 240. If block 615 detects from lane code 220 that the vehicle is in toll lane 111, then block 616 increments or otherwise modifies the distance log to reflect a total distance traveled in lane 111.

Blocks 620 process the toll. Block 621 receives the total lane distance from block 615 and calculates a toll amount. In the simplest case, this amount represents the total distance in the lane multiplied by a fixed toll factor stored in memory 422. More sophisticated applications may vary the toll factor according to roadway code 210, time of day, congestion of roadway 100, and/or other factors. Vehicle characteristics may be coded and sent, such as vehicle type (car, truck, trailer, etc.), or vehicle weight per axle; these characteristics may be coded in electronics 400, or may be transmitted from other vehicle components or from a roadside unit. Block 622 may send the current toll to vehicle 500 to be indicated on a display such as 502. Block 623 programs toll tag 430 with the current toll amount. Alternatively, communications unit 521 may transmit the toll and possibly a vehicle identifier to a roadside infrastructure unit 131. Communications may also be received by law-enforcement personnel to verify that the vehicle owner is paying the toll. Other embodiments may merely store the amount for other types of transmission to readers 120. Blocks 630 are performed by a toll reader 120 when the vehicle passes it. Block 631 interrogates toll tag 430 for the toll amount, or otherwise reads the toll amount. The transmission may also contain further data, such as a vehicle identification code stored in system 400 or 520. Block 632 bills the proper person, perhaps by transmitting the toll charge and vehicle identification code to a tolling database at a facility such as 130.

The toll charge may be a more complex function of the total lane distance. For example, rush hours may be accommodated. Block 640 reads a clock in license-plate system 400 or in vehicle 500, and transmits the time of day to block 621. Block 621 then adjusts the toll factor to different values depending upon the particular time at which the vehicle entered, occupied, or left lane 111.

Tolls may vary in more complex ways, such as according to congestion of one or more lanes. For this purpose, some of the tags 200 may identify themselves as congestion tags. Blocks 650 collect vehicle data for congestion-based toll calculation. If block 612 identifies a tag 200 as a first congestion tag from its flags 250, then block 651 records a current time as a beginning timestamp. If a tag's flags indicate that it is a second congestion tag, then block 652 records a current time as an ending timestamp. If the distance between the two congestion tags is known, then block 653 can calculate the vehicle's speed. If not, blocks 651 and 652 may also record the tags' location codes to generate a distance between them for calculating speed. In order to conserve bandwidth, block 653 may hold the vehicle speed data until a condition is met. The condition may include, for example, a transmission request from facility 130, passing a roadside transponder such as 131, or passing a tag 200 having a specific flag set. Block 655 transmits the speed data, via channel 442 or 522, or by other means, to roadside infrastructure unit 131 or to facility 130.

Blocks 660 determine a congestion factor that may depend upon vehicle speeds, vehicle density, and/or upon other factors, such as time of day. The central or regional facility may perform some or all of the functions of blocks 660. Block 661 receives speed data from block 654 in vehicle 500 and from other vehicles traveling in lane 111, or from other vehicles on roadway 100 as well. Block 662 may calculate a vehicle density value based upon the number of vehicle transmission received in block 661 per unit of time, or in other ways. Block 663 combines the vehicle speeds—e.g., by a running or weighted average—and the vehicle density to calculate a predetermined function yielding a congestion factor. Block 664 may transmit the congestion factor periodically to the vehicles. Block 656 in vehicle 500 receives the congestion factor, and block 621 applies it to the toll calculation. For example, the toll may comprise distance times a fixed base rate, times a rush-hour factor from block 640, times the congestion factor.

Other types of toll-rate factors or adjustments may also be calculated from data in the roadway tags, from data sent by the vehicle, from data transmitted by other vehicles, and/or from the infrastructure. Governmental agencies may employ these or other variations in the toll rate in order to regulate the usage of toll lane 111. To this end, communications unit 440 may indicate the current toll rate or charge on a driver display such as 502.

Tags 200 may also serve a purely navigational or guidance function. Lanes 141-143 all carry tags that include location codes for highway number, distance, or travel direction. These codes may be routed to a display in the vehicle for presentation to the driver, either in raw form or as converted into a map, equivalent latitude/longitude coordinates, or other format by on-board electronics. The codes may also be routed to an on-board GPS navigation unit (not shown), for use when GPS signals are unreliable because of buildings or overpasses, or in driving conditions where GPS is not accurate enough to determine whether, for example, the vehicle is on a highway or a nearby frontage road.

In some applications, vehicles may be located on a grid, such as in a parking lot, bus barn, or a facility for maintenance or truck loading. In such cases, tags 200 may have two-dimensional location codes and lane codes that indicate individual parking spots, loading docks, etc. Vehicles may detect these codes as they enter or leave a spot, and report them to an infrastructure facility. Other vehicles may then be guided to empty spots, or the locations of vehicles stored for location by bus drivers or scheduling software, for example.

Inter-Vehicle Warning Applications

A group of applications for intelligent highways concerns warning a vehicle of dangerous actions taken by another vehicle, or taken by the vehicle itself. Applications in this group employ communications among at least some of the vehicles. Communications may generally employ any of three architectures or modes for communications from one vehicle to another. A direct architecture transmits data directly from one vehicle to one or more other vehicles within the range of the channel, which receive the transmission, determine whether the message is applicable, and determine whether any action is to be taken. A distributed architecture transmits from the sending vehicle to an infrastructure unit within communications range. The infrastructure unit rebroadcasts messages to one or more other vehicles. The messages may be sent singly or may be aggregated. In a centralized architecture, the infrastructure unit receives messages from vehicles, determines whether one or more vehicles should act upon the message, and broadcasts a message generally or addressed to one or more specific vehicles.

FIGS. 1B, 7, and 8 illustrate an electronic brake-light application for warning the driver of a first vehicle when the actions of another vehicle close ahead in the same lane is slowing suddenly, so as to endanger the first vehicle. Hard braking exemplifies a number of safety applications in which the warning indication in a first vehicle must resolve the relative positions of other vehicles sufficiently to provide warning when appropriate, but to avoid the distraction of extraneous warnings. Methods 700 are performed in on-board electronics such as 400, 520, or 530, also employing in some embodiments other components of the vehicles. Although other architectures may serve as well, this implementation illustrates the direct communications mode, which requires no data from the infrastructure, from a map, or from external navigational aids such as GPS.

FIG. 1B depicts a further set 140 of lanes 141-143 among which vehicles 500 may move freely. Here, all of the lanes include passive tags such as RFID tags 200 that encode the same data as those in lanes 120, except that the direction segment signifies a westbound direction. Distance may be encoded in the manner described earlier. Tag spacing may differ from the spacing in lane 111, and may vary along the length of the lanes 140. For example, tags 200 may be spaced together more closely near traffic lights, to provide a finer distance resolution to antennas 330 or 560. Vehicles may thus read their location and lane for whatever purpose from tags 200 without reference to any map, either internal or external to the vehicle.

FIG. 7 shows a method 700 for transmitting messages to other vehicles directly. It may be executed periodically by all vehicles. Block 710 initiates a message upon a condition. For routine position messages, and for some other applications, the condition may simply be the expiration of a predetermined time interval.

Blocks 720 collect data for an outgoing message, including the position of the sending vehicle. If block 725 detects that the vehicle has encountered a new tag 200 in the roadway, block 721 reads its location code. ("Location" refers to longitudinal distance, and may include the roadway identifier or direction codes 210, 230, if present.) Block 723 reads the lane code of the encountered tag. If no new tag is currently being read, block 722 adds to the location code from block 721 a distance since the last tag was encountered. This value may be obtained from instruments 532 already in conventional vehicles, such as from the vehicle speedometer via OBD II connector 503 or from an accelerometer that is part of the vehicle or part of an installed VPS unit. This dead reckoning capability is significant, in that it permits a greater tag spacing while retaining high location accuracy.

Block 724 may also obtain other relevant data to include in the message. For example, vehicle length is an important characteristic in this and other applications; it permits either the receiving vehicle to determine the positions in its lane actually occupied by the sending vehicle, so as to calculate gaps or headway where another vehicle may enter that lane or occupy it without danger of collision. This characteristic may be stored in a memory such as 421 or 521, and may be modifiable to reflect the presence or absence of a trailer, etc. A trailer itself might contain a rudimentary system that transmits its own length to the towing vehicle for computing the vehicle's overall length. Block 724 may obtain further vehicle characteristics, such as type—truck, car, motorcycle, etc. Current parameters of the sending vehicle may also be included in the message. For example, vehicle speed and acceleration are often important. Whether or not the sending vehicle has its brake lights on or a turn signal engaged may be obtained by block 724 and included in the message. The term "parameter" herein refers to a variable quantity regarding the operation of a vehicle, such as speed or whether a brake light is illuminated. The term "characteristic" refers to a more static aspect of the vehicle, such as its length or type.

The use of lane identification in highway tags permits finer resolution at lower cost than that provided by external navigation technologies such as GPS. In a limiting case, tag-based systems may distinguish a vehicle on an overpass from another vehicle that is directly below it on a different roadway. The roadway/lane identifiers in the overpass tags distinguish them unambiguously from those in the lower roadway, even though their two-dimensional map positions may be identical. An external navigation system may indicate a collision between cars in the two roadways when in fact no danger exists. The transmission of vehicle length permits a much more accurate estimation of the actual distance between the sending and receiving vehicles than merely the positions of their reader antennas.

Block 730 generates header information that identifies the message as a position message. Block 740 broadcasts the message—header, current location, lane, and possibly other data such as length—via a facility such as medium-range communications channel 522.

FIG. 8 shows a method 800 executed by all vehicles, including the one executing method 700, for receiving messages directly from other vehicles. Block 810 monitors the appropriate communications channel in transceiver 522. Block 820 detects whether an incoming message is relevant to the recipient vehicle. Filtering out irrelevant messages quickly saves computation time, especially in high traffic-density situations. For example, a simple comparison of the transmitted lane code with the vehicle's own lane code can eliminate all threat evaluations for braking, rear-end collisions, and many other conditions. A difference in roadway designations may eliminate many irrelevant messages. A difference in distance code of, say, more than 200 meters may filter out practically all such messages. This fast filtering ability becomes more important in cities, where a communication range of up to 2000 meters may produce messages from thousands of vehicles at the same time. In order to obtain current information, block 820 may execute in parallel with blocks 825 or 830.

Block 825 stores the sender's current position and lane ID from the message, as well as other broadcast data from block 724, FIG. 7, such as vehicle length.

Blocks 830 determine the positions of the recipient vehicle. If block 831 detects that a new tag 200 has been detected, block 832 reads the current location code from that tag, and block 834 reads the lane code from that tag. If no new tag is currently being read, block 833 adds a dead-reckoned distance of the recipient's vehicle to the location code of the last-encountered tag.

Block 840 combines the data from all relevant sender vehicles and the recipient's data to determine whether or not a threat exists to the recipient. In this case, block 840 calculates the signed distance between the sender and the recipient vehicles, if the vehicles are in the same lane. The sign indicates whether the recipient is behind or ahead of the sender's vehicle. "Behind" and "ahead" are measured from corresponding points on the vehicles, such as their front ends—that is, from the positions measured within their own vehicles and broadcast to other vehicles. The lengths of the respective vehicles may also participate in the determination, so that the calculation finds the distance between the rear end of the sender and the front end of the recipient vehicle; in this application as in many others, vehicle length is a significant addition.

Block 840 may obtain a stored threshold, or may calculate a variable threshold, which may depend upon factors within the recipient vehicle or upon external environmental factors, such as icing conditions or a distance from the recipient to the nearest vehicle ahead of it. Information concerning these factors may originate inside the recipient vehicle, or may originate from data 801 transmitted by an infrastructure unit. Block 840 determines whether the recipient is behind the sender, whether the recipient is within the threshold distance from the sender, and whether the sender and recipient are in the same lane of the roadway. The threat evaluation may involve other sender vehicles, and not only the vehicle immediately ahead. If a threat exists, block 850 initiates an action. The action may include an alarm indication on a display such as 502 in the recipient vehicle. The display need not necessarily be (only) visual. For example, upon detection of a hard-braking threat, block 850 may cause an actuator to push back on the accelerator pedal of the at-risk recipient vehicle, thus giving the driver a tactile cue to slow down, while still allowing full speed control by the driver. Other actions, such as controlling some aspect of the recipient's vehicle, may also occur in block 850.

As an example, suppose that the vehicles labeled VA-VH in FIG. 1B transmit position messages via method 700, and that VE brakes hard, decelerating suddenly. Although all the other vehicles receive the messages, block 820 of method 800 executing in vehicles VA, VF, and VG find that the message is not relevant to them because their lane IDs differ from the lane ID broadcast from VE. Although vehicle VH is in the same lane as VE, it is ahead of VE, and therefore not in danger from the braking action. Although vehicle VD is behind VE and in the same lane, its distance may be great enough that it is not in sufficient danger to produce a threat in block 840. Only vehicles VB and VC are in the same lane and close enough to trigger a hard-braking alarm from blocks 840 and 850. Vehicle VC derives an especially great advantage from the alarm, because the large size of VB blocks its view of VE, so that the optical brake lights of VE may not be visible. Lane IDs are especially useful in this application, because they may provide lateral position more precisely than navigation facilities such as GPS, and they may operate when GPS is blocked by buildings or unreliable because of multi-path distortion. Also, it does not require a map, as GPS would. Vehicle lengths are also significant, as they specify the entire envelope— shown cross-hatched in FIG. 1B—that is occupied by their respective vehicles, and not merely a single point within this area. This permits recipients to calculate the actual roadway gap between their vehicles and others. Gaps may be measured in terms of distance along the roadway, or in terms of travel time over that distance.

FIGS. 1B, 7, 9, and 10 provide another inter-vehicle warning application, this time employing a distributed communications architecture to warn of an impending rear-end collision. This implementation is illustrated using the central communications architecture described above.

Every vehicle broadcasts a message via method 700 giving its current longitudinal and lane-of-travel position. Block 724 may insert vehicle data including its length. Other vehicle data may include speed, acceleration, or brake/turn-signal status in the message. In this example, block 740 may broadcast to an infrastructure unit 130 that is within range, instead of transmitting directly to other vehicles.

Method 900, FIG. 9, executes at the infrastructure unit. Block 910 detects position messages from all in-range vehicles, and routes them to block 920. Block 920 reads the vehicle data from each message: location, lane ID, and any other data inserted at block 724, such as vehicle length. Block 930 computes the envelope of space occupied by each vehicle (from the transmitted locations and lengths) to determine the gaps or spacings between vehicles in the same lane (from the transmitted lane IDs), to determine whether there is a rear-end collision threat to any of the vehicles. Speed and other data may permit further calculations, such as whether the gap between vehicles is increasing or decreasing. Block 930 may also consider external information 901, such as local icing or time of day. If a significant rear-end collision risk exists, block 940 identifies the at-risk vehicle. Vehicles may be identified in any convenient manner, such as by assigning a dynamic IP address, or by including static or temporary vehicle identification codes in messages broadcast by block 740, Block 950 composes a message having a header or type designation for a collision risk, and an identifier of the at-risk vehicle. Block 960 transmits the message that identifies the at-risk vehicle.

Method 1000, FIG. 10, is executed in all vehicles to receive collision messages from an in-range infrastructure unit. Block 1010 monitors the communications channel. Block 1020 detects received collision-warning messages. If block 1030 senses that the message is directed to this particular recipient vehicle, then block 1040 initiates action. The action in this example may be merely displaying a warning, or block 1040 may take other actions as well, such as pretensioning seat belts in the vehicle.

A centralized architecture may conserve bandwidth, since the infrastructure sends messages only to at-risk vehicles. It also standardizes the warning protocol, minimizing unforeseen interactions among different warning algorithms, and may be more efficient where knowledge of the local roadway geometry may facilitate determination of potential vehicle interactions. On the other hand, it would be more difficult to customize algorithms for different vehicle types, different on-board equipment, and so forth.

FIGS. 1B, 7, 8, and 11 provide assistance for lane changes and merges, employing a distributed architecture. All vehicles VA-VH, FIG. 1B, execute method 700 to transmit their own positions, including lane IDs and lengths, periodically.

In FIG. 11, method 1100 executes in an infrastructure unit within communications range of the vehicles. Block 1110 receives messages from all in-range vehicles. Block 1120 aggregates these messages from different vehicles into a single package. The package contains the positions, longitudinal and lane, of all the vehicles, as well as other information such as vehicle lengths for envelope determination. Block 1130 broadcasts the packaged messages from the infrastructure unit.

When a vehicle such as VA wishes to merge into center lane 142, it engages its right-hand turn signal. This causes block 820, FIG. 8, to detect the packaged messages 1140 from the infrastructure unit. Block 825 stores the positions and envelopes of the vehicles from the package, and blocks 832-834 calculate the current position—longitudinal, lane, and envelope—of VA. Block 840 determines from these envelopes or gaps between the vehicles whether it is safe for VA to change lanes and merge into an lane 142. That is, block 840 determines a merge threat for vehicles whose codes place them in adjacent lanes. Block 840 may also consider other factors, including vehicle parameters or characteristics, or environmental conditions. Vehicle speed may be a significant consideration. If block 840 finds that a threat exists, block 850 may initiate an action such as a warning light. Alternatively, block 840 may indicate lack of a threat, and cause block 850 to display an all-clear signal. The display may be more complex, for example indicating whether the space available for lane changes is increasing or decreasing, from calculations in block 840. Here again, data 801, from VA, from VB-VH (such as vehicle lengths or types), or from the external environment may participate in the threat decision of block 840. For example, packages from block 1130 may include acceleration data transmitted from the vehicles VA-VH, and block 840 may consider this data. Packages 1130 may include weather data such as icing condition for use by block 840. Further, as in other warning applications, drivers may be allowed to enter personal preferences, so that, for example, VA's driver may request a greater amount of free space before block 850 issues an all-clear display.

Figure 12:
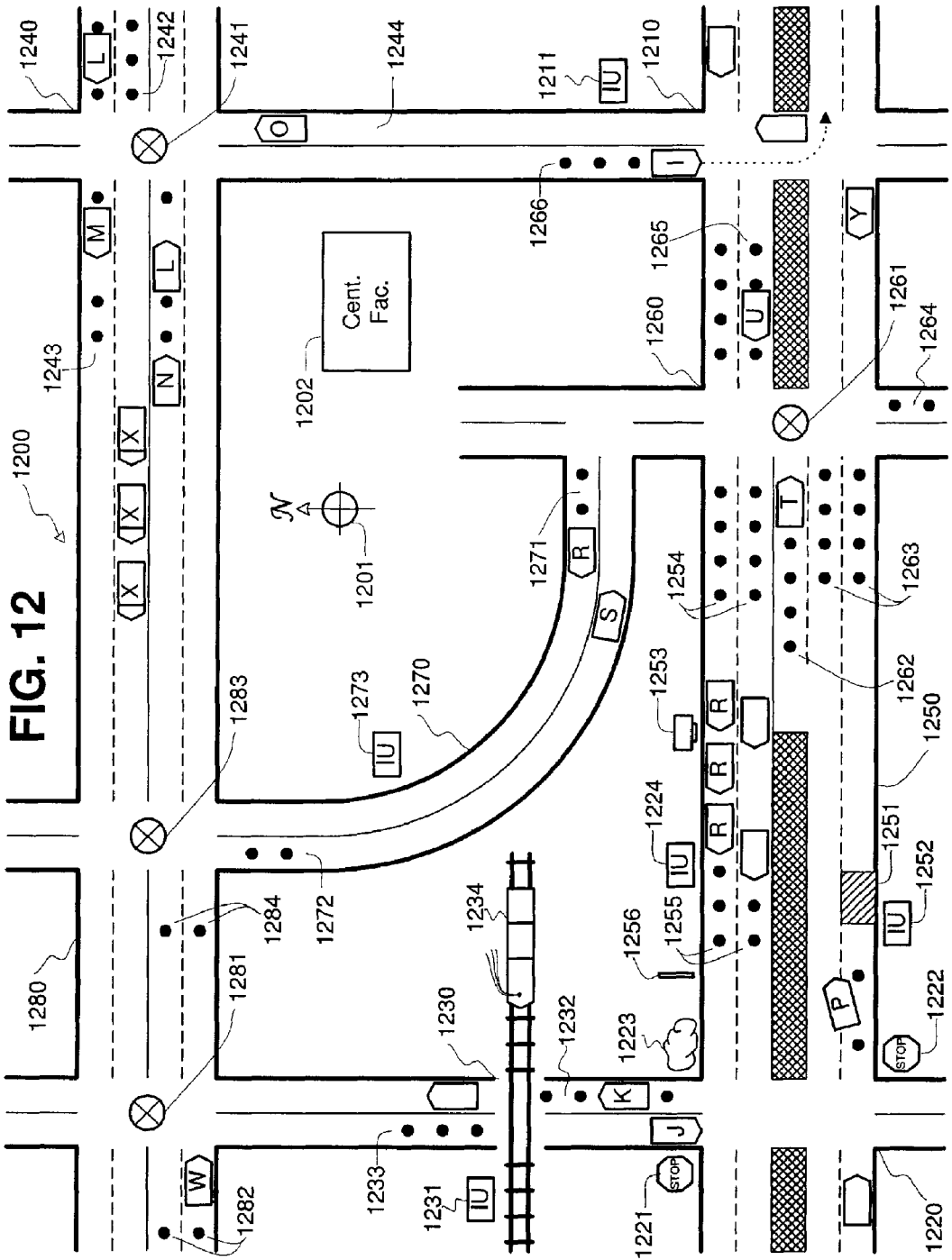
FIG. 12 is a schematic depiction of further roadway configurations for VPS applications.

FIG. 12 shows roadways 1200 including a number of additional features for illustrating VPS applications. FIG. 12 explicitly shows only some of the roadway tags, to avoid clutter. All or only some of the roadways 1200 may contain spaced tags bearing data as described in connection with FIG. 2, and the spacings or codes may vary at different locations. Compass directions 1201 in FIG. 12 are for illustration only.

FIGS. 7, 8, 11, and 12 enable a left-turn assistant that operates similarly to the lane-change merge warning. In FIG. 12, vehicle VI is approaching intersection 1210 from the north, and desires to turn left. (FIG. 12 indicates vehicles only by the last letter of the text designation; hence, vehicle VI is labeled "I".) Again using a distributed architecture, all nearby vehicles transmit their own position data via method 700. Infrastructure unit 1211 executes method 1100 to inform all vehicles of each others's whereabouts. Engaging the left-turn signal in VI causes block 820 to initiate method 800, using the packaged positions of the other vehicles. If block 840 determines that other vehicles approaching intersection 1210 are sufficiently distant, block 850 may signal all clear for the turn. Because the position data from other vehicles carries lane data and may include roadway designations or directions of travel, vehicles leaving the intersection are not flagged as dangerous, even though they may be closer to the intersection than other vehicles that are approaching the intersection. Further, block 840 may weight vehicles crossing the intersection (e.g., westbound at intersection 1210) differently from vehicles in the path of the left turn (northbound at 1210), if desired. Directions are arbitrary, and may be indicated in a number of ways, such as explicitly in directions codes 230 in the tags, implicitly by lane IDs, directions of increasing distance representations in location codes 240, or by means external to the tags if desired. Here again, if vehicle length is included in the location messages, VI may evaluate its risk more effectively in some situations. For example, block 840 may calculate the rear-end position of a vehicle that is currently crossing the intersection from south to north.

Another application concerns assistance for vehicles at stop signs. This application is also described using a distributed communications architecture. Southbound vehicle VJ is stopped at an intersection 1220 having stop signs 1221, 1222 on a secondary roadway crossing a major street. Vegetation 1223 may restrict vision toward the east, making it difficult to determine whether westbound vehicles are approaching the intersection. An infrastructure unit such as 1224 may receive and package position messages from all vehicles in the vicinity of the intersection. In vehicle VJ, method 800 may be initiated either automatically or upon the driver's request to block 820. Block 840 may then determine whether threats exist from other vehicles approaching intersection 1220. Block 840 may consider vehicles traveling through intersection 1220 from the east, west, or south. If block 724 of method 700 includes transmission by all vehicles of data indicating whether, e.g., their turn signals are engaged, and method 1100 packages this data, then block 840 may also modify threat determination based upon this type of data. That is, a collision warning may include threats from straight crossing paths, from left turns across VJ's path in opposite or lateral directions, or left or right turns into VJ's path, and the threats from these scenarios may be calculated differently. Again, the lanes occupied by both VJ and the other vehicles are known from the lane data in the roadway tags, and may be employed in the threat calculations. If block 724 includes length data, block 840's calculations may be refined by taking into account the total envelopes of other vehicles, and not merely the location of their front ends.

Any of the collision warning applications may initiate countermeasures to mitigate damage or injury. Using a direct communications architecture to illustrate a general collision warning, method 700 may broadcast position messages from all vehicles at block 740. Method 800, also executing in all vehicles, may receive position messages from all nearby vehicles in block 825, and block 840 may compare all vehicle positions or envelopes to the recipient vehicle's position or envelope; that is, method 800 may evaluate threats from multiple vehicles concurrently, and may evaluate multiple types of threat concurrently. Upon the detection of a threat, block 850 may deploy countermeasures, which may depend upon the type and the imminence of the threat. Generally, countermeasures fall into two groups, reversible and non-reversible. For example, a collision estimated to occur in a few seconds may initiate reversible measures such as seat-belt pretensioning, bumper extension or lowering, enabling sensor-based brake assistance or stabilization control, or airbag arming. On the other hand, more imminent collision threats may engage non-reversible measures such as pre-impact braking or deployment of airbags. Different types of threat may activate different measures; for example, an impending side collision may deploy only side airbags, leaving the driver's view ahead unimpeded for possible avoidance maneuvering. Less drastic countermeasures may serve primarily to increase the driver's situational awareness.

Railway intersection 1230 presents a further application. Vehicles such as VK approaching a railway crossing may transmit their positions to a roadside infrastructure unit 1231 using method 700. The condition of block 710 that activates transmitting a position message may be a flag in tags 1232 and 1233 in the lanes that lead toward the crossing. If there are tags in the other lanes (not shown) for other purposes, they will not contain the flag. That is, method 700 determines from a lane designation that the vehicle is in a lane that approaches the crossing 1230, so that warnings are not given to vehicles traveling away from the crossing, even though they may be positioned closer to the crossing. In a centralized architecture, method 900 receives train position, speed, or other data from infrastructure sensors 1231 or from the train 1234 itself. Block 930 determines whether a collision threat exists. Block 960 broadcasts a message to the appropriate vehicle VK, identified in block 940. This vehicle determines at blocks 1020 and 1030 that the warning message is directed to it, and initiates an action at 1040, such as displaying a warning to the driver of VK. In a distributed architecture, method 1100 broadcasts an aggregated message that includes vehicle VK, which then executes method 800 to initiate an action at block 850. A direct architecture may be employed here as well. Rather than issuing a warning at all times, an approaching train 1234 may determine its own position—on-board GPS may be sufficient for this purpose—and use a form of method 700 to broadcast a message to in-range vehicles directly or indirectly.

One of the most dangerous conditions on a roadway, especially a divided or high-speed roadway, is a vehicle such as VY traveling in the wrong direction. Therefore, another VPS application comprises a wrong-way warning. Block 710 of method 700 may detect that its own vehicle VY, near intersection 1210, is traveling in the wrong direction from any of several conditions. If longitudinal distance codes in the roadway tags always increase, then a decreasing distance from one tag to the next may detect a wrong-way condition. If directions are also encoded in the roadway tags, then successive distances that are inconsistent with the direction may signal the condition. Instead of, or in addition to, travel directions, certain lane numbers encoded in the tags may have a known travel direction, and may signal a wrong-way condition in block 710. If only the offending vehicle VY is to be notified, block 740 may display a warning to it alone, without further processing by method 700 or any other method. However, warning other nearby vehicles of this condition may be desirable. In that case, method 700 may also execute blocks 720, generate a "wrong-way" header in block 730, and transmit the message in block 740. Other vehicles may receive this message directly or through a local infrastructure unit, and display a warning or take other appropriate action.

Any of the inter-vehicle warning applications may employ direct, centralized, or distributed architectures. Different architectures may be appropriate for different applications, or under different conditions. Direct architecture needs no deployed infrastructure units, and may be useful in remote areas or in early stages of a deployment. Distributed architecture tends to conserve communications bandwidth, and permits vehicles to implement different algorithms for determining threats. Central architecture may also conserve bandwidth; and may have an advantage in enforcing uniformity of vehicle responses to threats and avoiding undesired interactions. Distributed and central architectures may utilize environmental or other external information, either transmitting it to vehicles or considering it in assessing a threat. Aspects of different architectures may be combined. For example, a direct architecture may also employ infrastructure units to provide environmental information, even if the units take no part in the actual communication of warning messages.

External-Condition Warning Applications

Another group of applications for intelligent vehicles or highways concerns warning a vehicle of dangerous conditions external to the vehicles themselves. Applications in this group employ communications between vehicles and the infrastructure. For the most part, vehicle communications may take place over medium-range (300-2000 meters) channels such as DSRC with local infrastructure units, although some applications may rely entirely upon data encoded in passive roadway tags themselves, in addition to the location codes. In many cases, the infrastructure units only need to transmit to vehicles, although some applications may provide extra utility if they also receive messages from vehicles. The infrastructure units may receive data from internal or nearby wired sensors, or may receive data from other infrastructure units or farther sensors via wireless communication, possibly on a different band or service from the one with which it transmits to vehicles. The infrastructure units may also be programmable, either from a unit itself or remotely from a central facility such as 1202, FIG. 12.

Figure 13:
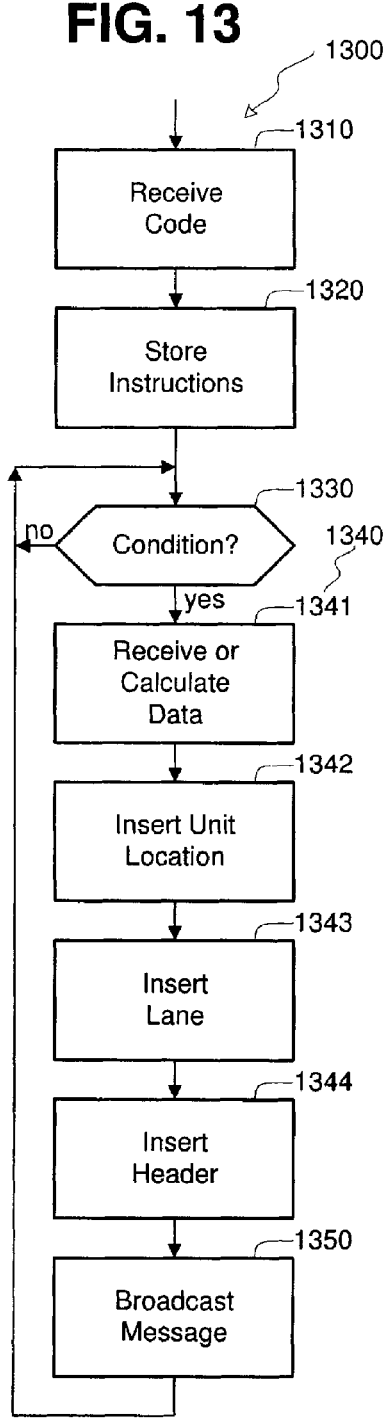
FIG. 13 shows further methods for transmitting messages from infrastructure units.

FIGS. 8, 12, and 13 illustrate one such application, in which a traffic signal 1241 at intersection 1240, FIG. 12, warns approaching vehicles of its presence or current condition via an integrated or nearby infrastructure unit, not shown separately in FIG. 12. Roadway tags near the intersection, indicated generally as 1242, may be spaced the same as along other roadway stretches, or differently. Closer spacings may improve distance accuracy for vehicles that are accelerating or decelerating, by reducing dead-reckoning errors, especially if connection to OBD or other vehicle sensors is not available.

FIG. 13 shows a routine 1300 executed by the infrastructure unit of traffic signal 1241. Block 1310 may receive code from an external source, such as an operator making adjustments to the signal, or from a central unit such as 1202. Block 1320 may store programming code for signal 1241. When block 1330 indicates the signal is red, blocks 1340 compose a message that includes the position of the signal in the coordinates used by tags 1242, block 1342. Block 1343 inserts one or more lane designations. For example, a red east-west signal light designates all lanes along roadway 1243, but not those of north/south roadway 1244. If the signal concerns only a particular lane, such as a red arrow for a left-hand turn lane, then the message may designate only that lane. Block 1344 inserts a header identifying the message as a "red light warning," and block 1350 broadcasts the message.

Yellow-light warnings may employ the same overall approach, but with additional information in the message. For example, block 1341 may read a time-to-red quantity from signal 1241 for insertion in the message broadcast at 1350. Red-light messages may specify time-to-green, if desired. Block 1341 may include other data as well.

Vehicles may execute a method such as 800, FIG. 8, to receive a signal-warning message. Block 820 detects the red-light header from method 1300, and may also filter out irrelevant messages; for example, it may discard north/south red-light warnings in north/south vehicles on roadway 1244, such as VO. Block 825 stores the position and relevant lane data of the signal. Blocks 832-834 calculate the recipient vehicle's current position, including its lane. Block 840 then determines whether the vehicle should be warned of the signal. For example, if the signal message contains lane designations for the lanes of roadway 1243, then vehicles VL may warn their drivers at block 850. VM is not warned, even though it is in a westbound lane, because its position and direction indicate that it is past the signal's intersection. VN does not display a warning, because its position places it beyond a range where it may need to take action in response to the signal. Such distances may differ between different kinds of signal, such as red and yellow lights. Block 840 may also take into account the speed and acceleration of its own vehicle. For example, an accelerating or high-speed vehicle may be warned at a greater distance from the signal position. Block 850 may warn the driver of an upcoming yellow light, may warn of an impending violation based upon speed or other factors, or may signal an actual violation, either within the vehicle itself or by sending a message to an infrastructure unit.

If desired, methods such as 700, 900, and 100 may also receive position messages from nearby vehicles at unit 1241, and transmit messages to all or some vehicles, which then may assess other possible dangerous conditions. For example, even though northbound vehicle VO has a green light, it may detect a message at 820, FIG. 8, that vehicles VL are close to a yellow light at 1241 that is to turn red in a very short time, or that they are approaching a red light at a high rate of speed. Method 900 may designate only the lanes of north/south roadway 1244 for this warning, and only vehicle VO, reading its on northbound lane and position south of the intersection will determine in block 840 that VL might run the red light. Conversely, signal 1241 may receive messages indicating that a number of vehicles VL are approaching a yellow light, and extend the time before the light turns red. Green lights may be extended in a similar manner for large volumes of approaching traffic.

An application may warn or reroute vehicles of road conditions, such as work zones or congestion. In area 1250, FIG. 12, 1251 indicates a temporary blockage of the right-most east-bound lane due to road work, or possibly due to a collision, stopped vehicle, or other condition. An infrastructure unit 1252, possibly portable or battery-powered, may be programmed at block 1320 with the location, lane number, and possibly also start/stop time or duration, or rerouting directions for the obstruction, for block 1341. Block 1350 broadcasts the obstruction message to all vehicles.

Vehicles such as VP and VR within radio reception range of unit 1252 detect this message type at block 820. Block 840 determines whether the recipient vehicle is close enough and in the appropriate lane(s) to alert its driver of the obstacle. For example, east-bound VP may be warned, but vehicles VR in westbound lanes separated by a median may not generate a warning. The warning, block 850, may be a simple alert, may indicate the lane and distance ahead of the obstruction, or may display text received in the message (e.g., "workmen in right lane ahead" or "take next exit"), or might even generate its own text for display, using knowledge of its own position from blocks 832-834 (e.g., "merge left 300 feet").

Warnings for traffic conditions such as congestion may execute similarly. Sensor 1253 may measure the traffic flow in roadway section 1250, and generate congestion messages in blocks 1340, either at the sensor itself or in a nearby infrastructure unit such as 1224. The sensor may be a radar unit, a current loop, a camera, or other suitable means. If vehicles in the area transmit continuous messages containing their own positions in a method such as 700, the sensor may be merely a unit that receives them and calculates a congestion index at block 1341, FIG. 13.

Another application may indicate safe speeds for curves 1270 or other conditions. Simple warnings may not require a local infrastructure unit. Instead, tags 1271 and 1272, positioned ahead of the curve in the direction of vehicle travel, may contain flags 250 or other data 260, FIG. 2, indicating a reduced-speed curve, and codes specifying its safe speed. A vehicle receiver method such as 800 or 1000 then detects a curve-speed warning from the flags (e.g., at 1020), match the lane IDs in the vehicle and in the roadway tag, and display a warning to the driver of a vehicle such as VR. VR may read the vehicle's own speed at 802 and cancel the warning if the speed is already lower than the safe speed. VS does not display the warning, because it has passed the region 1272 where the tags contain it. Although VR and VS are so close to each other that a reasonably priced external navigation or positioning system such as GPS may be unable to separate their positions, the lanes of their travel, as indicated in the roadway tags, can easily cause one car to display a warning, while other nearby vehicles do not display the warning.

A more complex system may vary the safe speed depending upon roadway conditions. Roadside unit 1273 may sense environmental conditions such as darkness, rain, or icing at block 1330, FIG. 13, calculate a different safe speed at 1340, and broadcast a speed warning at block 1350.

Intelligent speed adaptation is an application that has been researched in Europe for in-vehicle display or even enforcement of speed limits. However, these systems employ GPS for vehicle position and utilize digital maps for speed databases. In the present context, passive roadway tags may encode speed limits or approaching limits in a data field 260. Such tags even permit different speeds for different travel directions or for different lanes, a resolution finer than is attainable with external navigation systems. Returning to roadway section 1250, for example, some or all of the tags 1254 may encode an approaching 45 mph limit, and tags 1255 may encode a 45 mph zone. Tags 1254 may be detected at block 820 to cause a warning display at block 850, and 1255 may display the current limit when the vehicle detects a tag having that code.

If desired, the displayed text may be more complex. The tags may indicate the position of the speed zone, and blocks 830 may determine the vehicle's distance to the zone beginning. Block 850 may then display a message such as "45 mph zone starts in 500 feet." Actual vehicle speed may be read at 802 to facilitate the display of text, or to decide not to display the approach. Tags 1255, in the zone itself, may cause the display to indicate the current speed at all times, or to indicate that the vehicle is exceeding the limit. Block 850 may also affect engine controls at block 850 to physically limit vehicle speed as long as the zone tags continue. Such limits may be particularly useful in zones where safety requires very low speeds, where speed bumps might be placed otherwise.

Speed limits may be variable or dynamic, if an infrastructure unit is placed locally. A local unit such as 1252 may be programmed to send temporary speed-limit messages for work zones or crosswalks, using method 1300. Sensors such as 1253 may detect pedestrians in a crosswalk, causing method 1300 to broadcast a predetermined speed limit. Again, method 800 detects the message type at block 820 for an appropriate display or other action at block 850, using the vehicle's present position and lane and the broadcast position and/or lane. Dynamic speed limits may take into account environmental conditions such as weather, perhaps broadcast from a more central unit 1202 to roadside unit 1252.

More generally, any type of signage may be made available in-vehicle, to inform or alert the driver, in the same manner. Text on display 502, FIG. 5, may be coded into roadway tags or broadcast by an infrastructure unit for reception over the DSRC or other communications channel to alert the driver as to highway exits, upcoming stop signs, school zones, and similar environmental features. For example, sign 1256 may alert drivers to an upcoming blind intersection at 1220. If tags 1255 carry the alert, encoding the message text or a key to a library of on-board stored messages, it is not necessary in this case to read or calculate the current vehicle position in blocks 832-834. Only the tags in the westbound lanes to the east of the sign are flagged for the sign, so that the sign text is not displayed to vehicles in the westbound lanes at all. Lanes may be designated more specifically, if desired. For example, the current distance to an exit may be dynamically displayed only to vehicles in a designated exit lane. In more advanced system, the message may differ for different vehicles. For example, some of the vehicles VR in congestion zone 1250 may be directed to continue straight ahead, while others may be directed to a different lane, and still others to an exit. Such load balancing is enabled by knowing the specific lane of each vehicle in the area, as read in block 723 and broadcast in a position message at 740, FIG. 7.

Alternatively, nearby infrastructure unit 1252 may broadcast the signage text, which is then detected by block 820 and displayed at 850. In this implementation, the message may designate the sign's position and particular lanes to receive the alert. Blocks 832-834 then calculate the current vehicle position and compare the vehicle's current lane with the message's lane designations, and block 820 may quickly filter out messages for vehicles not in those lanes. If a vehicle is within a certain longitudinal distance of the sign and in the appropriate lane(s), then block 850 displays the sign. Block 802 may also supply in-vehicle data, such as speed, so that block 840 may cause the sign to be displayed at a specific time interval ahead of the sign, instead of at a specific distance. Type of vehicle may also modify display of the sign. For example, block 840 may display low-bridge or height/weight restrictions only if data 802 (encoded at 724 and broadcast at 740) indicates that the recipient vehicle is a truck.

Purely informational signs may also be implemented, either by tag codes or by message transmission from an infrastructure unit. Such electronic signs may replace hotel, restaurant, or gas-stations highway signs. Signs may indicate points of interest or tourist information.

Traffic-Control Applications

Very common—but also very high-maintenance—equipment presently detects the presence of vehicles near areas such as controlled intersections, in order to adjust the intervals of traffic lights and similar signal devices. This equipment, generically referred to herein as a current-loop detector, may be buried in specific lanes of a roadway so as to detect cars only in those lanes that pass a specific point.

Intersection 1260, at the lower left of FIG. 12, has a timed traffic signal 1261 that includes an infrastructure unit capable of receiving position messages from vehicles. If the VPS function of signal 1261 is limited to a simple form of traffic control, it need not be capable of transmitting massages, as signal 1241 does. Although the roadways at this intersection may contain passive tags for other purposes, tags 1262-1266 are directly involved in the traffic-control application. Highway codes in tags 1262, 1263, and 1265 identify them as belonging to the east/west roadway, while 1264 and 1266 belong to the north/south street. Tags 1262 carry a lane code 220 that identifies them to the signal as being a left-turn lane. Tags 1263 are coded as straight-through eastbound lanes, and 1265 as straight-through west-bound lanes. One or more tags in each lane may carry "detector" flags 250 that mark them as being at a position where a current loop would normally reside.

Vehicles may transmit messages that identify their positions with a method such as 700, FIG. 7. Block 710 may initiate a position message when the vehicle passes a tag carrying a "detector" flag. Blocks 720 update the vehicle's current position and lane. Block 724 may insert data indicating the vehicle length. Block 730 may generate a "position message" header, and block 740 then broadcasts the message.

Figure 14:
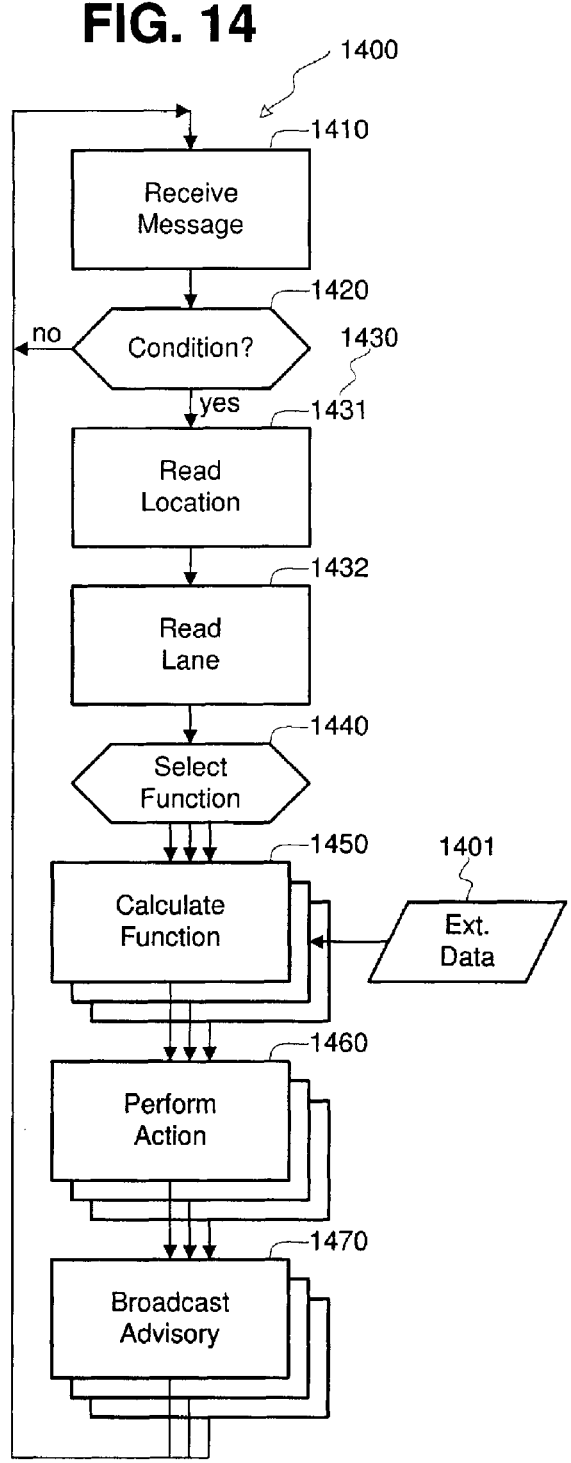
FIG. 14 shows further methods for receiving messages at infrastructure units.

FIG. 14 shows a method 1400 executed by the infrastructure unit of signal 1261. Block 1410 receives messages from all in-range vehicles on the appropriate communications channel, and block 1420 determines that they are position messages, or other appropriate message types. Block 1420 may also pass only those messages having turn-lane indicators. Blocks 1430 read the vehicle position from the message. Block 1431 reads the highway code 210 and the longitudinal location code 240 to determine where the vehicle is with respect to the known signal position. Block 1432 reads the lane code, and possibly a direction code, to determine the vehicle's direction of travel. Block 1440 uses the message information to select a function 1450 to perform. For example, the presence of vehicle VT in the dedicated left-turn lane may cause block 1450 to add a count to a left-turn accumulator. A vehicle passing tags 1263 or 1265 may accumulate counts in an accumulator for east/west green light. If a vehicle such as VU in the left westbound lane has its left turn flasher on, block 724 may include a suitable indication in the transmitted message, and block 1440 may use the lane ID and the turn-signal flag to accumulate a count for a westbound left turn light in signal 1261, even though it has no dedicated turn lane for this direction. Block 1460 may initiate an action in response to the functions calculated in block 1450. For example, reaching a count of three vehicles, or a single vehicle in two minutes, in the dedicated left-turn lane while the north/south light is green may trigger block 1460 to turn on the eastbound left turn green arrow. Any functions available to current-loop detectors are available to this system as well. In addition, signal 1261 may employ external environmental or infrastructure data 1401 from sensors or from central units such as 1202 in calculating the functions. For example, icing conditions may lengthen yellow-light times. If vehicles include their lengths in the broadcast messages, block 1450 may calculate when the rear of a vehicle has passed a given position. Because legacy current-loop detectors detect presence of any part of a vehicle at the loop position, length data may mimic them, permitting replacement of current loops with less modification of their programming.

Another traffic-control application concerns modifying normal signals to permit passage of emergency vehicles such as fire trucks and ambulances. For example, ambulance VW heading east on roadway 1280 may force nearby traffic signal 1281 to switch to red immediately for north/south traffic, and may later switch signal 1283 similarly as VW approaches within a certain distance. The present system achieves this result easily, at very little incremental cost. Ambulance VW may execute a method 700 when block 710 detects that its emergency flashers or siren have been turned on. VW includes its current highway, location, and lane codes in blocks 720. Block 730 may insert an "emergency request" header, and block 740 broadcasts the message indicating VW's current position.

Method 1400 executes in all traffic signals, such as 1281, 1283, 1241, 1261, etc. When block 1420 detects that a received message is an emergency request, blocks 1430 read VW's position. Knowing the position of the unit in which it executes, method 1400 may read the vehicle position codes and lane, and block 1430 may calculate when to turn the lights red in signal 1281. VW's broadcast lane or direction codes may specify which direction turns red, or all directions may turn red. When signal 1281 notes from its broadcast highway, location, and lane codes that VW has passed signal 1281 by a certain distance, block 1460 may return its light pattern to normal. As VW proceeds eastward, its position message causes 1283 to switch. This system may additionally provide functions not available to present techniques. For example, method 700 may include a flag denoting that VW has its right turn indicator activated while approaching signal 1281, which may respond by switching signal lights at an intersection south of 1280, or causing another infrastructure unit to flash a warning at intersection 1220.

Roadway tags may also be employed for more complex strategies, such as routing emergency vehicles through certain intersections, depending upon traffic conditions or environmental factors. Other strategies may extend green lights at appropriate signals such as 1283 or 1241, so as to flush traffic through ahead of the emergency vehicle.

In another example, buses may generate a transit signal priority message in order to preempt traffic signals to maintain their schedules as they move through signalized intersections.

Routes heavily traveled by large trucks, or having designated truck lanes, may benefit from another application. Indeed, such areas or lanes may be detected by infrastructure monitors in the present system. As noted above, specific vehicle types may broadcast messages carrying designations of their type, weight, length, or other characteristics. For example, signals 1241, 1281, or 1283 may detect position messages from a number of trucks VX in the left lane of roadway 1280, headed west, in blocks 1410-1430, FIG. 14. Blocks 1440 and 1450 may then select or calculate a speed appropriate to these signals that will permit them to form up as a constant-speed platoon without having to stop at red lights. One of the blocks 1460 may communicate with signals such as 1283, and 1281 to synchronize them for the appropriate speed by extending red or green times, as described earlier. Further, one of the blocks 1470 may transmit this speed to the trucks. Method 800 in the vehicles may then detect this speed-advisory message at block 820, may read their own positions and lane IDs, determine from speedometer data in block 802 the difference between their own speed and the advisory speed, and display the difference in block 850, so they may adjust accordingly.

A further application may meter traffic into a limited-access roadway. For example, some jurisdictions employ on-ramp meters to throttle the number of vehicles onto a high-speed roadway, in order to avoid congestion in the vicinity of the ramp. Returning to FIG. 1B, entry ramp 144 leads onto westbound lane 141.

Facility 130 may measure westbound traffic density by receiving position messages from nearby vehicles. Blocks 1430 may read highway, position, or lane/direction tags from these messages to determine in block 1450 how many vehicles are currently in the lanes relevant to on-ramp 144. Block 1460 may then send an interval to a local ramp meter 132 to dynamically control the timing of vehicles onto the roadway. If desired, tags 203 on the ramp may indicate traffic density on the ramp as well in essentially the same manner as in the current-loop replacement application described above. Blocks 1420-1430 may detect position messages from the vehicles, identify them as from vehicles passing tags designated with ramp-lane codes, and include this data in the calculation of block 1450.

CONCLUSION

The foregoing description and drawing illustrate certain aspects and embodiments sufficiently to enable those skilled in the art to practice the invention. Other embodiments may incorporate structural, process, and other changes. Examples merely typify possible variations, and are not limiting. Method steps need not be performed in a specific order. Portions and features of some embodiments may be included in, substituted for, or added to those of others. Individual components, structures, and functions are optional unless explicitly required, and operation sequences may vary. The word "or" herein implies one or more of the listed items, in any combination, wherever possible. The required Abstract is provided only as a search tool, and is not to be used to interpret the claims. The scope of the invention encompasses the full ambit of the following claims and all available equivalents.

We claim as our invention:

1. A method performed in an infrastructure unit, comprising:
   receiving a plurality of radio frequency messages from a plurality of vehicles, the messages corresponding to longitudinal locations of vehicles along a roadway and lanes of the roadway occupied by the vehicles;
   calculating a function from the longitudinal locations and the lanes;
   performing an action in response to the function, wherein the action concerns controlling a traffic signal.

2. A method performed in an infrastructure unit, comprising:
   receiving a plurality of radio frequency messages from a plurality of vehicles, the messages corresponding to longitudinal locations of vehicles along a roadway and lanes of the roadway occupied by the vehicles;
   calculating a function from the longitudinal locations and the lanes;
   performing an action in response to the function, wherein the action concerns controlling a signal for a turn lane.

3. A method performed in an infrastructure unit, comprising:
   receiving a plurality of radio frequency messages from a plurality of vehicles, the messages corresponding to longitudinal locations of vehicles along a roadway and lanes of the roadway occupied by the vehicles;
   calculating a function from the longitudinal locations and the lanes;
   performing an action in response to the function, wherein one of the messages contains data indicating that the sender is an emergency vehicle,
   the function concerns a distance of the emergency vehicle from the signal,
   the action controls the signal so as to facilitate passage of the emergency vehicle.

4. A method performed in a vehicle on a roadway having a designated toll lane and at least one other lane in the same direction as the toll lane, comprising:
   interrogating a sequence of passive roadway tags so as to receive a location codes representing a longitudinal location and a lane code representing the toll lane when the vehicle occupies the toll lane;
   maintaining a log representing a cumulative distance in which the vehicle occupies the toll lane;
   communicating data representing the cumulative distance to an infrastructure unit at a predetermined place along the roadway.

5. The method of claim 4 further comprising detecting an end-of-toll lane code in one of the passive roadway tags located at the predetermined place, and where the data is communicated in response to detecting the end-of-toll-lane code.

6. The method of claim 4 where the data is communicated by a programmable RFID tag in the vehicle.

* * * * *